US012745840B2

(12) United States Patent
Tang et al.

(10) Patent No.: US 12,745,840 B2
(45) Date of Patent: Sep. 29, 2026

(54) BASE FOR AN ENCLOSURE COMPRISING AT LEAST ONE REMOVABLE PANEL AND METHOD OF FORMATION THEREOF

(71) Applicants: Edward Tang, Rosemead, CA (US); Brandon Foon, Rosemead, CA (US)

(72) Inventors: Edward Tang, Rosemead, CA (US); Brandon Foon, Rosemead, CA (US)

( * ) Notice: Subject to any disclaimer, the term of this patent is extended or adjusted under 35 U.S.C. 154(b) by 171 days.

(21) Appl. No.: 18/631,069

(22) Filed: Apr. 10, 2024

(65) Prior Publication Data

US 2025/0318638 A1 Oct. 16, 2025

(51) Int. Cl.

*A47B 47/00* (2006.01)
*A01G 9/02* (2018.01)
*A01K 63/00* (2017.01)
*A47B 96/20* (2006.01)

(52) U.S. Cl.

CPC ................ *A47B 47/00* (2013.01); *A01G 9/02* (2013.01); *A01K 63/006* (2013.01); *A47B 96/20* (2013.01); *A47B 2096/209* (2013.01); *A47B 2220/0091* (2013.01)

(58) Field of Classification Search

CPC ... A47B 47/00; A47B 96/20; A47B 2096/209; A47B 2220/0091; A01G 9/02; A01K 63/006
USPC ..................... 312/257.1, 265.1, 265.5, 265.6
See application file for complete search history.

(56) References Cited

U.S. PATENT DOCUMENTS 3,387,587 A 6/1968 Kelley et al.
3,997,139 A 12/1976 Young et al.
4,147,131 A 4/1979 Walker
4,235,493 A * 11/1980 Bridges .................. A47B 47/03 312/265.3
4,723,820 A * 2/1988 Kroneck .................. A63H 3/52 312/265.6
(Continued)

FOREIGN PATENT DOCUMENTS

CN 201238535 Y 5/2009
CN 201499521 U 6/2010
(Continued)

OTHER PUBLICATIONS

"Aquarium tank stands", by Ultum Nature Systems, Found Online in [Feb. 2026] https://ultumnaturesystems.com/aquarium-tank-stands/.

(Continued)

*Primary Examiner* — James O Hansen
(74) *Attorney, Agent, or Firm* — LegalForce RAPC Worldwide

(57) ABSTRACT

An apparatus includes a cabinet for supporting an enclosure. The enclosure includes a head jamb of the frame located at the top-horizontal portion of the frame. The enclosure includes a vertical jamb of the frame of the cabinet that is attached to the head jamb to provide stability for the cabinet. The enclosure includes a base jamb of the frame of the cabinet that is attached to the vertical jamb to provide stability for the cabinet. The enclosure includes a housing that is attached to the head jamb. The enclosure includes a magnet at least partially encased in the housing. The enclosure includes a panel removably attached to the frame by magnetically connecting to the magnet encased within in the housing.

14 Claims, 11 Drawing Sheets

(56) References Cited

U.S. PATENT DOCUMENTS

| | | | | | |
|---|---|---|---|---|---|
| D340,550 | S | 10/1993 | Teats | | |
| 5,263,772 | A | 11/1993 | Ritzow | | |
| 5,295,743 | A * | 3/1994 | Moulton | E06B 9/115 | 312/297 |
| D377,242 | S | 1/1997 | Kelley | | |
| 5,820,238 | A * | 10/1998 | Lambright | G11B 23/0236 | 312/324 |
| 5,826,882 | A * | 10/1998 | Ward | G07F 17/3216 | 312/265.5 |
| 6,527,609 | B1 * | 3/2003 | Rowland | A63H 3/52 | 446/478 |
| 7,165,749 | B2 | 1/2007 | Venezia | | |
| 7,421,976 | B1 | 9/2008 | Travers | | |
| 7,843,295 | B2 | 11/2010 | Fullerton et al. | | |
| 7,886,696 | B2 | 2/2011 | Marks et al. | | |
| D669,643 | S | 10/2012 | Kilroy | | |
| D693,066 | S | 11/2013 | Kilroy | | |
| 8,966,816 | B2 | 3/2015 | Toone et al. | | |
| 9,125,492 | B1 | 9/2015 | Kane et al. | | |
| D756,040 | S | 5/2016 | Rathbone | | |
| 10,550,586 | B2 * | 2/2020 | Jeffries | A47B 97/00 | |
| D889,047 | S | 6/2020 | Kapaun | | |
| 2009/0095226 | A1 | 4/2009 | Riemma | | |
| 2011/0155073 | A1 | 6/2011 | Kilroy | | |
| 2011/0168102 | A1 | 7/2011 | Kilroy | | |
| 2011/0203526 | A1 | 8/2011 | Kilroy | | |
| 2012/0169196 | A1 * | 7/2012 | Marchetti | E06B 5/006 | 312/265.6 |
| 2013/0092093 | A1 | 4/2013 | Potts | | |
| 2016/0235201 | A1 * | 8/2016 | Sööt | A47B 96/20 | |
| 2017/0156499 | A1 * | 6/2017 | Kane | A47B 96/20 | |
| 2017/0202189 | A1 | 7/2017 | Chun | | |
| 2021/0106135 | A1 * | 4/2021 | Gullo | A47B 47/02 | |
| 2023/0225509 | A1 * | 7/2023 | Bebout | A47B 96/20 | 49/501 |

FOREIGN PATENT DOCUMENTS

| | | | |
|---|---|---|---|
| CN | 204191388 | U | 3/2015 |
| CN | 207219827 | U | 4/2018 |
| CN | 109220961 | B | 9/2020 |
| CN | 113170756 | A | 7/2021 |
| CN | 111418546 | B | 10/2021 |
| CN | 214758655 | U | 11/2021 |
| CN | 215303940 | U | 12/2021 |
| DE | 202019105193 | U1 | 11/2019 |
| TW | M547832 | U | 9/2017 |

OTHER PUBLICATIONS

“Aquarium Stand—Fish Tank Cabinet”, by Ultum Nature Systems, Available Online in [May 3, 2024] https://www.amazon.in/Ultum-Nature-Systems-Aquarium-Stand/dp/BOD1VYTZFK.

“Oceanson V5 120—Hex Front Aquarium and BASE”, by Oceanson, Found Online in [Feb. 2026] https://coburgaquarium.com.au/cdn/shop/products/48.jpg?v=1602984075.

“Aquarium Cabinate”, by Aqua Club, Found Online in [Feb. 2026] https://www.aquaclubonline.com/aquarium-cabinets/.

“Aquarium Tank & Cabinet Set”, by Discus, Found Online in [Feb. 2026] https://www.discus.ae/cdn/shop/files/boyu-aquarium-set_1024x1024.jpg?v=1705235253.

“Aquarium Stand and Cabinet”, by Landen, Found Online in [Feb. 2026] https://m.media-amazon.com/images/I/810TLu0qddL._SX522_.jpg.

“Marine Aquarium”, by Happy Fins, Found Online in [Feb. 2026] https://cpimg.tistatic.com/08949427/b/4/Custom-Made-Marine-Aquarium-For-Office-House-Decoration-With-Cabinet.jpg.

“Glass Cabinet Fish Tank”, by Rs, Found Online in [Feb. 2026] https://4.imimg.com/data4/BR/DK/ANDROID-19039195/product-1000x1000.jpeg.

“Reefer Peninsula P500—White Cabinet”, by Zoanthus, Found Online in [Feb. 2026] https://www.zoanthus.fr/18270-medium_default/red-sea-reefer-peninsula-p500-white-cabinet-500-liters.webp.

“Fluval Aquarium Cabinet/Stand”, by Fluval, Found Online in [Feb. 2026] https://safaripetcenter.com/cdn/shop/products/15206_FL_PremAquKit_29Tall_Set_Int_2048x.jpg?v=1652895025.

* cited by examiner

BASE FOR AN ENCLOSURE COMPRISING AT LEAST ONE REMOVABLE PANEL AND METHOD OF FORMATION THEREOF

FIELD OF TECHNOLOGY

A base for an enclosure comprising at least one removable panel and associated methods of formation are described, and more particularly to a plant growth apparatus in the form of a paludarium, and its associated methods of formation.

BACKGROUND

A cabinet may be used as a base for an enclosure. The enclosure may be an aquarium, terrarium, paludarium, and/or any other apparatus used to house plants, animals, and/or other viewable objects. The enclosure may be used by gardening enthusiasts, animal enthusiasts, and/or educational institutions to form a microenvironment to foster plant growth despite an incompatible ambient environment. In addition, the enclosure may be used to add visual beauty and/or interior design to one's home, business, and/or office. Furthermore, the enclosure may be used commercially to breed and grow animals, plants, fungi, protists, and/or monera.

The cabinet may be used to support the enclosure and/or house equipment used to maintain and/or enhance the enclosure. The cabinet may be bulky and/or require an overly large footprint because the cabinet may require hinged openings with a door that moves in a pivoting manner. The hinged openings may require the cabinet, and subsequently the enclosure, to be placed in a limited number of spatial settings due to a need for enough space to allow movement of the door and/or hinged opening.

Due to footprint issues, the hinged openings of the cabinet may also be limited to just one side of the enclosure, with the other sides sealed off. If only one side of the enclosure is openable, working on and/or moving components within the cabinet may be tedious, difficult, and/or frustrating. Without the ability to approach equipment within the cabinet at multiple angles, users may be prone to breaking components and/or hurting themselves. Furthermore, The hinged openings may also comprise metal hardware which can oxidate and deteriorate due to the presence of water. Oxidation may eventually cause the metal hardware to fail, creating a need for replacement.

If not hinged, the doors of the cabinet may be slidable, which may require substantial internal hardware. The internal hardware may consume valuable cabinet space that may otherwise be used for equipment used to maintain and/or enhance the enclosure. Because these slidable doors may consume a large footprint within the cabinet, placing multiple slidable doors on the cabinet may be impractical, as more internal hardware is needed as more slidable doors are added. Furthermore, the internal hardware for the slidable doors may oxidate in the presence of water and saltwater, which may lead to equipment failure and a subsequent need to replace parts.

SUMMARY

Disclosed is a base for an enclosure comprising at least one removable panel and associated methods of formation. Other features will be apparent from the accompanying drawings and from the detailed description that follows.

In one aspect, an apparatus includes a cabinet for supporting an enclosure. The cabinet comprises a frame to provide the primary structural support for the cabinet. The apparatus includes a head jamb of the frame located at the top-horizontal portion of the frame. The apparatus includes a vertical jamb of the frame of the cabinet that is attached to the head jamb to provide stability for the cabinet. The apparatus includes a base jamb of the frame of the cabinet that is attached to the vertical jamb to provide stability for the cabinet. The apparatus includes a housing that is attached to the head jamb. The apparatus includes a magnet at least partially encased in the housing. The apparatus includes a panel removably attached to the frame by magnetically connecting to the magnet encased within the housing. The panel at least partially closes the cabinet when it is attached to the frame by magnet connection.

The apparatus may further include a frame lip located on the exterior of the head jamb, the base jamb, and/or the vertical jamb. The frame lip may include an outer point and/or an inner point which together may form an oblique angle to each other. The frame lip may further include a lip exterior that may be the most exterior portion of the frame lip. The apparatus may include a beveled perimeter of the panel that may be formed at an oblique orientation relative to a panel interior and/or a panel exterior. The beveled perimeter may be substantially between the panel interior and/or the panel exterior. The beveled perimeter and/or the frame lip may form a ninety degree angle when the panel is attached to the cabinet by the magnet. The lip exterior and/or the panel exterior may be substantially planar when the panel is attached to the frame. The panel may attach to the magnet at an area below the beveled perimeter.

The apparatus may include a screw that may attach the housing to the head jamb of the frame. The screw may be at least partially encased within the housing. The screw may be made of stainless steel, brass, titanium, and/or aluminum. The cabinet, the frame, the frame lip, and/or the panel may be comprised of aluminum which may provide resistance to rusting. The apparatus may include a cable management box affixed within the cabinet that may be accessible through the interior of the cabinet. The apparatus may further include a grab space formed at an area substantially between the outer point of the frame lip and/or a panel top. The panel may be shorter than the distance from a bottom of the cabinet and/or the outer point of the frame lip which may form the grab space and/or allow for a user to grab the panel substantially near the panel top and/or pull the panel away from the magnets. The housing may be made from a polycarbonate, an acrylonitrile butadiene styrene, a polyethylene, a polypropylene, a polyvinyl chloride, a polyethylene terephthalate, a polyurethane, a silicone, a thermoplastic elastomers, and/or a thermoplastic polyurethane.

In another aspect, an apparatus includes a cabinet for supporting a terrarium, an aquarium, and/or a paludarium. The cabinet is a cuboid shape. The apparatus includes a frame of the cabinet comprising a plurality of head jambs, a plurality of left vertical jambs, a plurality of right vertical jambs, and a plurality of base jambs. Each of the head jambs is at the top-horizontal portion of the frame. Each left vertical jamb and each right vertical jamb connects to a corresponding head jamb. Each left vertical jamb and each right vertical jamb further attach to a corresponding base jamb. The plurality of head jambs, the plurality of left vertical jambs, the plurality of right vertical jambs, and the plurality of base jambs connect to form the frame of the cabinet.

The apparatus includes a plurality of housings attached to each of the head jambs. At least two housings are attached to each of the head jambs. The apparatus includes a plurality of magnets encased in the plurality of housings. Each housing individually encases at least one magnet. The apparatus includes a plurality of screws attaching the plurality of housings to the plurality of head jambs of the frame. The plurality of screws attaches at least one housing to at least one head jamb and the plurality of screws are at least partially encased within the housings. The apparatus includes a plurality of panels removably attached to the cabinet by magnetically connecting the panels to the magnets encased within the housings.

The apparatus further includes a frame lip on the exterior of each of the head jambs, each of the left vertical jambs, and each of the right vertical jambs. The frame lip comprises an outer point and an inner point. The outer point and the inner point of the frame lip are at a substantially oblique angle from each other. The apparatus includes a grab space formed at an area substantially between the outer point of the frame lip and a panel top. The panels are shorter than the distance from a bottom of the cabinet and the outer point of the frame lip to form the grab space and allow for a user to grab the plurality of panels substantially near the panel top and pull the panel away from the magnets.

The apparatus may further include a beveled perimeter of the plurality of panels that may be formed at an oblique orientation. The beveled perimeter may be substantially between a panel interior and/or a panel exterior. The beveled perimeter and the frame lip may form a ninety degree angle when at least one panel is attached to the cabinet by the magnet. A lip exterior and the panel exterior may be substantially planar when at least one panel of the plurality of panels is attached to the frame. The panels may attach to the magnets at an area below the beveled perimeter. The apparatus of the frame, the frame lip, and/or the panels may comprise aluminum, stainless steel, and/or galvanized steel to prevent rusting.

The apparatus may include a cable management box that may be affixed within the cabinet and/or may be accessible through the interior of the cabinet. The apparatus may include a middle post of the frame which may further reinforce the cabinet when the cabinet is in a substantially rectangular configuration. The middle post may be a vertically running support that may be attached to at least one base jamb and/or at least one head jamb. The middle post may be substantially halfway between one of the left vertical jambs and/or one of the right vertical jambs.

The apparatus may include a pair of planar front panels. Both of the planar panels may be adjacent to the middle post which may make the cabinet (comprising the plurality of panels) two panels wide and/or one panel deep. The plurality of housings may be made from a polycarbonate, an acrylonitrile butadiene styrene, a polyethylene, a polypropylene, a polyvinyl chloride, a polyethylene terephthalate, a polyurethane, a silicone, a thermoplastic elastomers, and/or a thermoplastic polyurethane. The plurality of screws may be made of a stainless steel, a brass, a titanium, and/or an aluminum.

In yet another aspect, a method includes assembling a cabinet designed to support a terrarium, an aquarium, and a paludarium by connecting a plurality of head jambs, a plurality of left vertical jambs, a plurality of right vertical jambs, and a plurality of base jambs to form a frame of the cabinet in a substantially cuboid shape. The method includes attaching a plurality of housings to each of the head jambs using a plurality of screws. Each housing is designed to encase at least one magnet. The plurality of screws are at least partially encased within the housing. The plurality of screws are made of stainless steel, brass, titanium, and aluminum. The method includes aligning and magnetically securing a plurality of panels to the frame of the cabinet by engaging the magnets encased within the housings with corresponding areas on the panels. The panels are designed to be at least one-half of an inch shorter than the distance from the bottom of the cabinet to a top portion of the head jamb to facilitate removal.

The method may further include mitering a frame lip into the frame. The frame lip may comprise an outer point and/or an inner point that may be formed at an oblique angle from one another on the exterior of the plurality of head jambs, the plurality of base jambs, and/or the plurality vertical jambs. The frame lip may comprise a lip exterior that may be the most exterior portion of the frame lip. The method may include cutting a beveled perimeter into the plurality of panels at an oblique orientation. The beveled perimeter may be at a panel interior. The beveled perimeter and the frame lip may form a ninety degree angle when the panel is attached to the cabinet by the magnet.

A panel exterior and the lip exterior may be substantially planar when the plurality of panels are attached to the frame. The panel may attach to the magnet at an area below the beveled perimeter. The method may include installing a cable management box within the cabinet which may be accessible through the interior of the cabinet. The method may further include reinforcing the structure of the cabinet by attaching a middle post between at least one base jamb and/or at least one head jamb. The method may include positioning the middle post substantially halfway between two corresponding vertical jambs for cabinets in a substantially rectangular configuration.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A base for an enclosure comprising at least one removable panel and associated methods of use are described, and more particularly to a base for a plant growth apparatus in the form of a paludarium, and its associated methods of use.

Figure 1:
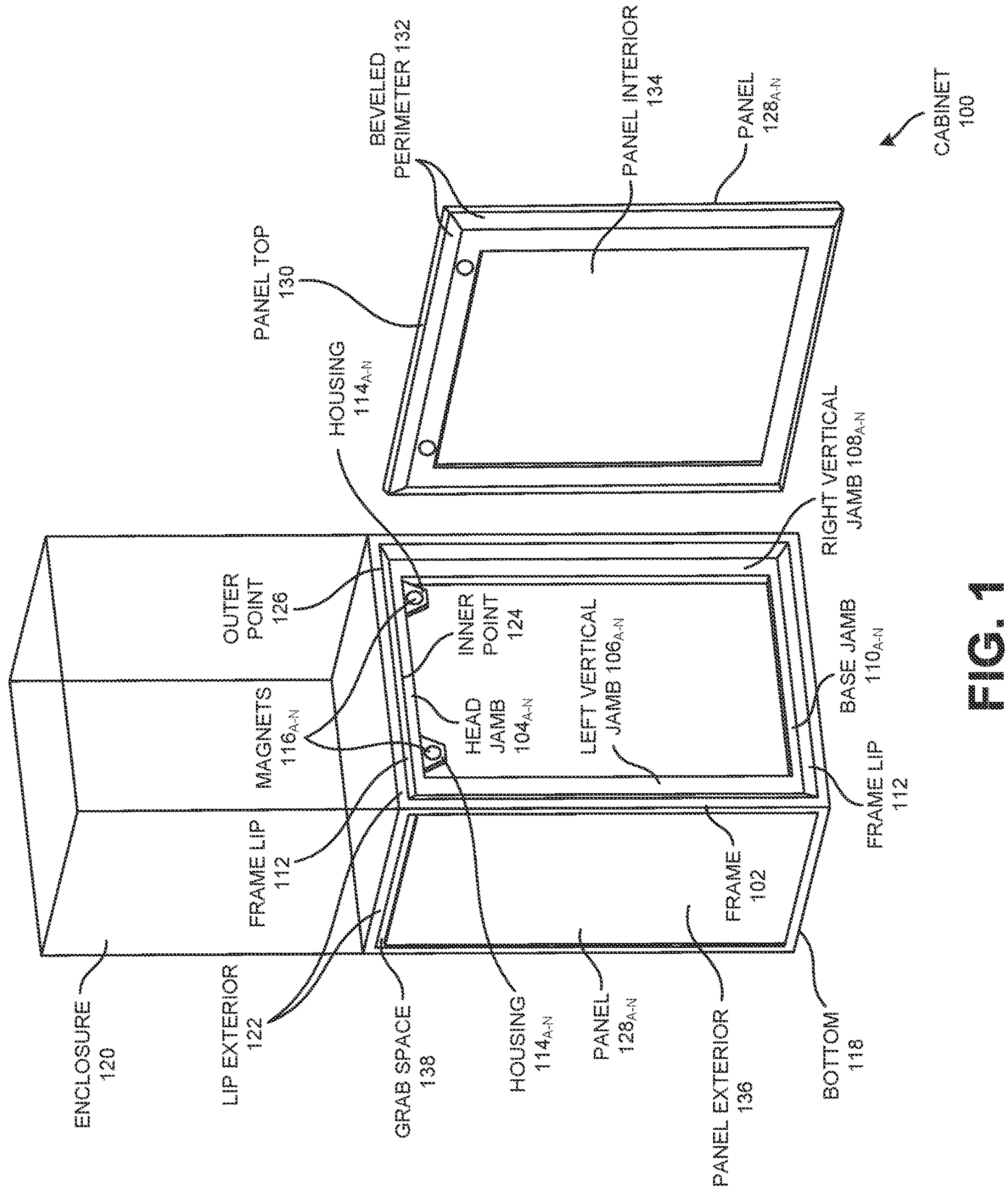
FIG. 1 is a schematic view of a cabinet for supporting an enclosure comprising at least one panel wherein at least one panel of the cabinet is removed from the cabinet, according to one embodiment.

FIG. 1 is a schematic view of a cabinet 100 for supporting an enclosure 120 comprising at least one panel 128A-N wherein the at least one panel 128A-N of the cabinet 100 is removed from the cabinet 100, according to one embodiment. FIG. 1 discloses a cabinet 100, a frame 102, at least one head jamb 104A-N, at least one left vertical jamb 106A-N, at least one vertical jamb 108A-N, at least one base jamb 110A-N, a frame lip 112, a plurality of housings 114A-N, a plurality of magnets 116A-N, a bottom 118, an enclosure 120, a lip exterior 122, an inner point 124, an outer point 126, at least one panel 128A-N, a panel top 130, a beveled perimeter 132, a panel interior 134, a panel exterior 136, and a grab space 138.

The cabinet 100 may comprise the frame 102 and/or the at least one panel 128A-N. The cabinet 100 may be designed as a modular and/or versatile base suitable for supporting enclosures 120 including but not limited to aquariums, terrariums, and/or paludariums. The cabinet 100 may be composed of various materials including but not limited to metal, wood, plastic, and/or other elements to provide a robust support structure for the enclosure 120. The frame 102 may comprise the at least one head jamb 104A-N, the at least one left vertical jamb 106A-N, the at least one right vertical jamb 108A-N, the at least one base jamb 110A-N, and/or the frame lip 112. The frame 102 and all of its components may be constructed from a single mold process. The frame 102 may be constructed from durable materials including but not limited to metal, wood, plastic and/or other elements to provide a robust support structure for the enclosure 120.

The at least one head jamb 104A-N of the frame 102 may be positioned toward the top portion of the frame 102 of the cabinet 100. The at least one head jamb 104A-N may be adjacent to and/or below the frame lip 112. The at least one head jamb 104A-N may be connected to the at least one left vertical jamb 106A-N and/or the at least one right vertical jamb 108A-N. The at least one left vertical jamb 106A-N of the frame 102 and/or the at least one right vertical jamb 108A-N of the frame 102 may be used to at least partially define corners of the cabinet 100. The at least one left vertical jamb 106A-N and/or the at least one right vertical jamb 108A-N may be adjacent to the frame lip 112 and/or interior to the lip exterior 122.

The at least one base jamb 110A-N may be a part of and/or near the bottom 100 to anchor and/or stabilize the cabinet 100. The at least one base jamb 110A-N may be adjacent, above, and/or interior to the frame lip 112. The at least one base jamb 110A-N may be connected to the at least one left vertical jamb 106A-N and/or the at least one right vertical jamb 108A-N. The frame lip 112 may be a part of the frame 102 of the cabinet 100. The frame lip 112 may be designed to provide a seamless edge around the the at least one head jamb 104A-N, the at least one left vertical jamb 106A-N, the at least one right vertical jamb 108A-N, and/or the at least one base jamb 110A-N of the frame 102. The frame lip 112 may comprise the inner point 124, the outer point 126, and/or the lip exterior 122.

The plurality of housings 114A-N may be attached to the at least one head jamb 104A-N of the frame 102. The plurality of housings 114A-N may be comprised of polycarbonate, acrylonitrile butadiene styrene, polyethylene, polypropylene, polyvinyl chloride, polyethylene terephthalate, polyurethane, silicone, thermoplastic elastomers, thermoplastic polyurethane and/or any other material that may provide resistance to damage and/or oxidation.

The plurality of housings 114A-N may accommodate the plurality of magnets 116A-N. Each one of the plurality of housings 114A-N may encase at least one of the plurality of magnets 116A-N. The plurality of magnets 116A-N may be strategically placed within the housings 114A-N to securely attach the panels 128A-N to the cabinet 100 without the need for hardware including but not limited to hinges, joints, and/or sliding brackets. The bottom 118 may be the lowest most portion of the cabinet 100. The bottom 118 may be a part of and/or connect to the at least one base jamb 110A-N of the frame 102 and/or the frame lip 112 of the frame 102. The bottom 118 may be a separate structure from the at least one base jamb 110A-N of the frame 102 and/or the frame lip 112 of the frame 102.

The enclosure 120 may be an aquarium, terrarium, paludarium, and/or any other enclosure used to display items including but not limited to plants, animals, rocks, artifacts, and/or memorabilia. The lip exterior 122 may be the most exterior portion of the frame lip 112 of the frame 102. The lip exterior 122 may be substantially flat and may encircle the frame lip 112 of the frame 102. The inner point 124 and/or the outer point 126 may be points of the frame lip 112. The inner point 124 may be the innermost portion of the frame lip 112 and/or may be adjacent to the various jambs of the frame 102. The outer point 126 may be the outermost portion of the frame lip 112 and/or may be adjacent to the lip exterior 122 of the frame 102. The inner point 124 and the outer point 126 may be obliquely angled from one another, which may create a beveled appearance for the frame 102.

The at least one panel 128A-N may be made of a magnetizable material and/or may be removably attached to the cabinet 100 via magnets 116A-N. The at least one panel 128A-N may be a door-like structure that may substantially form the sides of the cabinet 100 and/or substantially enclose the interior of the cabinet 100. The at least one panel 128A-N may be completely removed from the cabinet 100 without the need to remove any hardware which may allow for a user to view and/or work within the interior of the cabinet 100. The panel top 130 may be the uppermost portion of each of the at least one panel 128A-N and/or may be above the beveled perimeter 132 of the upper-horizontal portion of the panel 128. The beveled perimeter 132 may be an obliquely angled perimeter of the at least one panel 128A-N and may form a ninety-degree angle with the frame lip 112 of the frame 102 when the panel 128 is attached to the cabinet 100 via the magnets 116A-N.

The panel interior 134 may be the inside portion of the at least one panel 128A-N and/or may face toward the interior of the cabinet 100 when the panel 128 is attached to the cabinet 100. The panel interior 134 may magnetically connect to the plurality of magnets 116A-N. The panel exterior 136 may be the outermost portion of the at least one panel 128A-N and may face away the interior of the cabinet 100 when the panel 128 is attached to the cabinet 100. The panel exterior 136 may be made of any material so long as the material maintains the shape of the at least one panel 128A-N. The grab space 138 may be an open space above the panel top 130 and below the frame lip 112 of the at least one head jamb 104A-N. The grab space 138 may be any size so long as a user can grab the at least one panel 128A-N.

According to one embodiment, FIG. 1 discloses the cabinet 100 that may support the enclosure 120. The enclosure 120 may be a terrarium, an aquarium, and/or a paludarium. The cabinet 100 may be a substantially cuboid shape. The cabinet 100 may comprise the frame 102 of the cabinet 100. The frame 102 may comprise the at least one head jamb 104A-N, the at least one left vertical jamb 106A-N, the at least one right vertical jamb 108A-N, and/or the at least one base jamb 110A-N. The at least one head jamb 104A-N may be at the top-horizontal portion of the frame 102. The at least one left vertical jamb 106A-N and/or the at least one right vertical jamb 108A-N may connect to a corresponding head jamb 104A-N.

The at least one left vertical jamb 106A-N and/or the at least one right vertical jamb 108A-N may further attach to a corresponding base jamb 110 wherein when connected, the at least one head jamb 104A-N, the at least one left vertical jamb 106A-N, the at least one right vertical jamb 108A-N, and/or the at least one base jamb 110A-N may form the frame 102 of the cabinet 100. The cabinet 100 may further comprise the plurality of housings 114A-N which may be attached to the at least one head jamb 104A-N. At least two housings 114A-N may be attached to each of the head jambs 104A-N. Furthermore, the at least one magnet 116A-N of the plurality of magnets 116A-N may be encased in the plurality of housings 114A-N.

Each housing 114A-N may encase at least one magnet 116A-N. A plurality of screws 202A-N (not shown) may attach the plurality of housings 114A-N to the at least one head jamb 104A-N of frame 102. At least one of the plurality of screws 202A-N (not shown) may attach at least one housing 114A-N to the at least one head jamb 104A-N. The plurality of screws 202A-N (not shown) may be at least partially encased within the plastic housings 114A-N. The cabinet 100 may further comprise at least one panel 128A-N that may be removably attached to the to the cabinet 100 by magnetically connecting the panel 128A-N to the magnets 116A-N encased within the plastic housings 114A-N.

The cabinet 100 may further comprise the frame lip 112 on the exterior of the at least one head jamb 104A-N, the at least one left vertical jamb 106A-N, and/or the at least one right vertical jamb 108A-N. The frame lip 112 may comprise the outer point 126 and/or the inner point 124. The outer point 126 and the inner point 124 of the frame lip 112 may be at a substantially oblique angle from each other. The frame 102, frame lip 112, and/or the at least one panel 128A-N may be comprised of at least one of aluminum, stainless steel, and/or galvanized steel to prevent rusting.

The cabinet 100 may further comprise the grab space 138 formed at an area substantially between the outer point 126 of the frame lip 112 and the panel top 130. The at least one panel 128A-N may be shorter than the distance from the bottom 118 of the cabinet 100 and the outer point 126 of the frame lip 112 to form the grab space 138 to allow for a user to grab the panel 128A-N and/or pull the panel away from the magnets 116A-N. The at least one panel 128A-N of the cabinet 100 may comprise beveled perimeter 132 of the at least one panel 128A-N that may be formed on edge of the panel 128A-N at an oblique orientation. The beveled perimeter 132 may be substantially between the panel interior 134 and the panel exterior 136. The beveled perimeter 132 and the frame lip 112 may form a ninety degree angle when the at least one panel 128A-N is attached to the cabinet 100 by the magnets 116A-N. Furthermore, the lip exterior 122 of the frame lip 112 and the panel exterior 136 may be substantially planar when the at least one panel 128A-N is attached to the frame 102. The at least one panel 128A-N may attach to the magnets 116A-N at an area below the beveled perimeter 132 on the panel interior 134.

Although FIG. 1 discloses at least one panel 128A-N removed from the cabinet 100, the cabinet 100 may comprise any number of panels 128A-N and thus any number of housings 114A-N, magnets 116A-N, head jambs 104A-N, left vertical jambs 106A-N, right vertical jambs 108A-N, base jambs 110A-N, housings 114A-N, and/or magnets 116A-N. Furthermore, although FIG. 1 discloses a substantially cuboid shaped cabinet 100, the cabinet 100 may be any polyhedron comprising various configurations.

Figure 2:
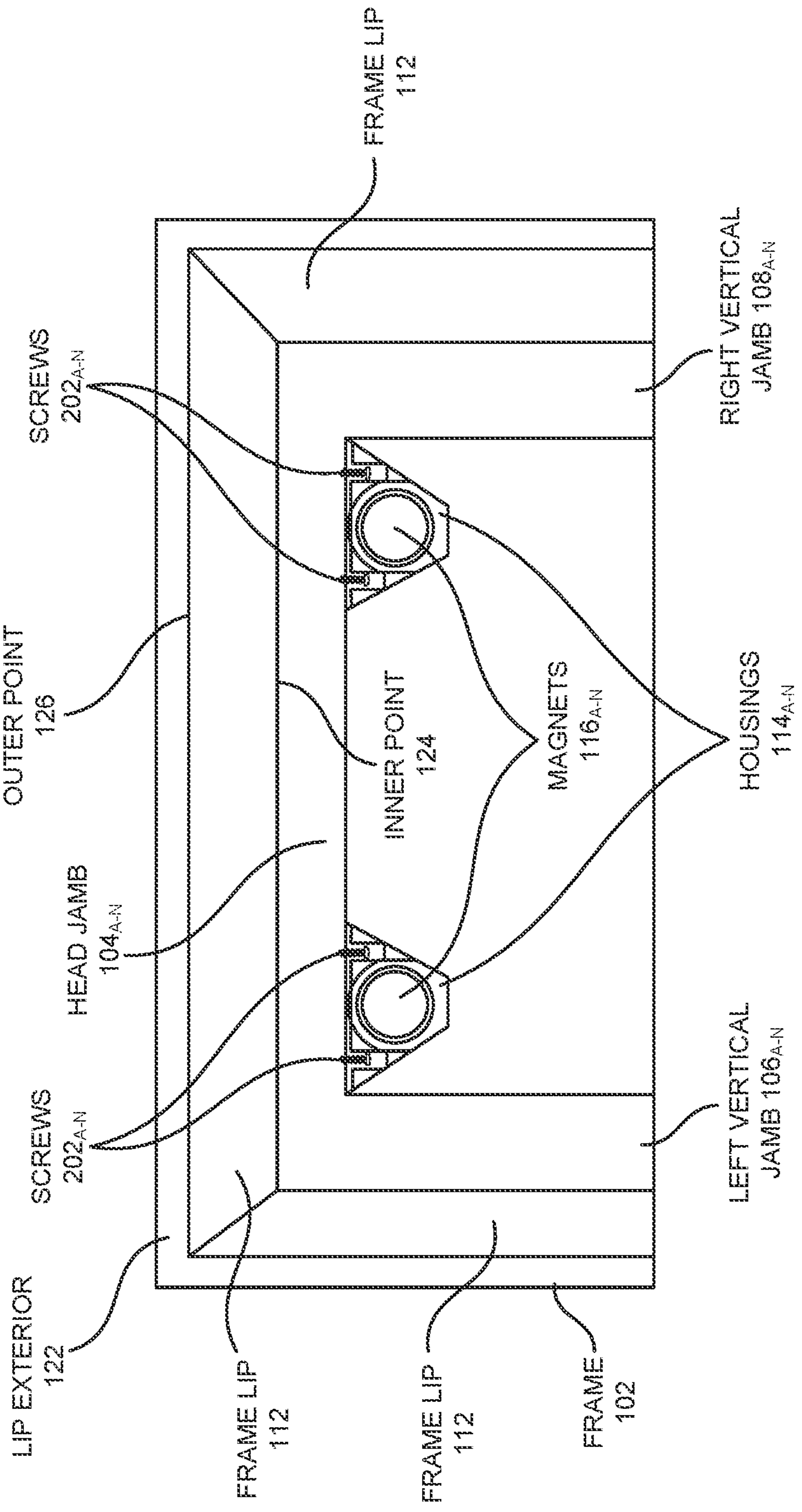
FIG. 2 is a schematic illustration of the upper portion of one side of the cabinet of FIG. 1 wherein at least one panel is removed from the cabinet, according to one embodiment.

FIG. 2 is a schematic illustration of the upper portion of one side of the cabinet 100 of FIG. 1 wherein at least one panel 128A-N is removed from the cabinet 100, according to one embodiment. FIG. 2 discloses the frame 102, the at least one head jamb 104A-N, the at least one left vertical jamb 106A-N, the at least one right vertical jamb 108A-N, the frame lip 112, the plurality of housings 114A-N, the plurality of magnets 116A-N, the inner point 124, the outer point 126, and/or a plurality of screws 202A-N.

The plurality of screws 202A-N may be metallic screws used to attach the housings 114A-N to the at least one head jamb 104A-N of the frame 102. The screws 202A-N may be stainless steel screws, brass screws, bronze screws, titanium screws, aluminum screws, plastic screws, carbon fiber screws, galvanized steel screws, and/or precision machine screws for secure fitting in pre-drilled holes. The plurality of screws 202A-N may further include self-tapping screws for creating their own thread as they are driven into the material, to ensure a tight and secure fit.

According to one embodiment, FIG. 2 discloses the frame 102 comprising one head jamb 104 (e.g. the at least one head jamb 104A-N) with two housings 114A-N (e.g. the plurality of housings 114A-N) attached. The two housings 114A-N may each be attached to the head jamb 104 via two screws 202A-N (e.g. the plurality of screws 202A-N). The two screws 202A-N may be at least partially encased/housed within their corresponding housing 114A-N. The housings 114A-N may encase at least one of the magnets 116A-N to protect and/or suspend the magnets 116A-N. Although the housings 114A-N are shown attached to the at least one head jamb 104, the housings 114A-N may be individually attached to any portion of the frame 102 with any amount of magnets 116A-N encased within. The housings 114A-N may be mounted to the frame 102 in any orientation so long as the magnets 116A-N encased within can sufficiently support the at least one panel 128A-N (not shown).

As further shown in FIG. 2, the frame 102 may further comprise the frame lip 112 and the frame exterior 122. The frame lip 112 may be a subcomponent of the frame 102 that extends at least partially outward from the frame 102 at a substantially oblique angle. The frame lip 112 may comprise the inner point 124, the outer point 126, and/or the lip exterior 122. The inner point 124 may be the portion of the frame lip 112 closest to the various jambs of the frame 102. The outer point may be the point where the oblique angle of the frame lip 112 ends its outward trajectory. The lip exterior 122 may be adjacent to the outer point 126 of the frame lip 112 and/or may be substantially flat relative to a vertical plane.

Figure 3:
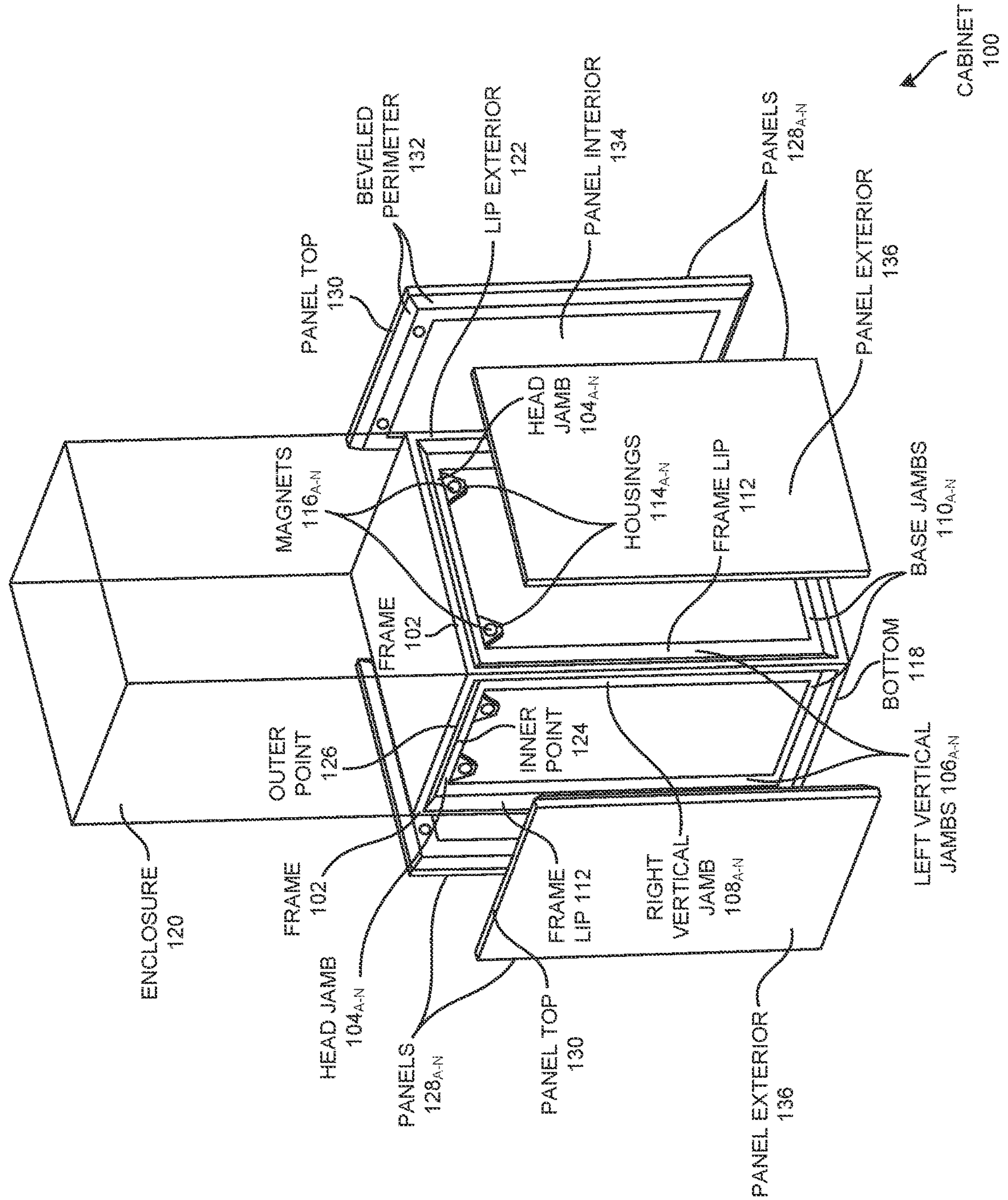
FIG. 3 is an exploded view of the cabinet of FIGS. 1-2 wherein four panels are removed from the cabinet, according to one embodiment.

FIG. 3 is an exploded view of the cabinet 100 of FIGS. 1-2 wherein four panels 128A-N (e.g. the at least one panel 128A-N) are removed from the cabinet 100, according to one embodiment. FIG. 3 discloses the the cabinet 100, the frame 102, head jambs 104A-N (e.g. the at least one head jamb 104A-N), the left vertical jambs 106A-N (e.g. the at least one left vertical jamb 106A-N), the right vertical jambs 108A-N (e.g. the at least one right vertical jamb 108A-N), the base jambs 110A-N (e.g. the at least one base jamb 110A-N), the plurality of housings 114A-N, the plurality of magnets 116A-N, the enclosure 120, the inner point 124, the outer point 126, the panels 128A-N, the panel top 130, the beveled perimeter 132, the panel interior 134, and/or the panel exterior 136.

According to one embodiment, FIG. 3 discloses the cabinet 100 with four panels 128A-N (e.g. the at least one panel 128A-N) removed from the frame 102. In FIG. 3, the panels 128A-N have been pulled away from the magnetic connection of the magnets 116A-N, which may expose the panel interior 134 and/or the interior of the cabinet 100 wherein various equipment and/or goods may be stored. The panels 128A-N may attach to the magnets 116A-N at an area below the beveled perimeter 132 of the panels 128A-N. The beveled perimeter 132 may surround the entire individual panels 128A-N and/or may be adjacent to the base jambs 110A-N, the head jambs 104A-N, the left vertical jambs 106A-N, and/or the right vertical jambs 108A-N when the panels 128A-N are attached to the frame 102.

Figure 4:
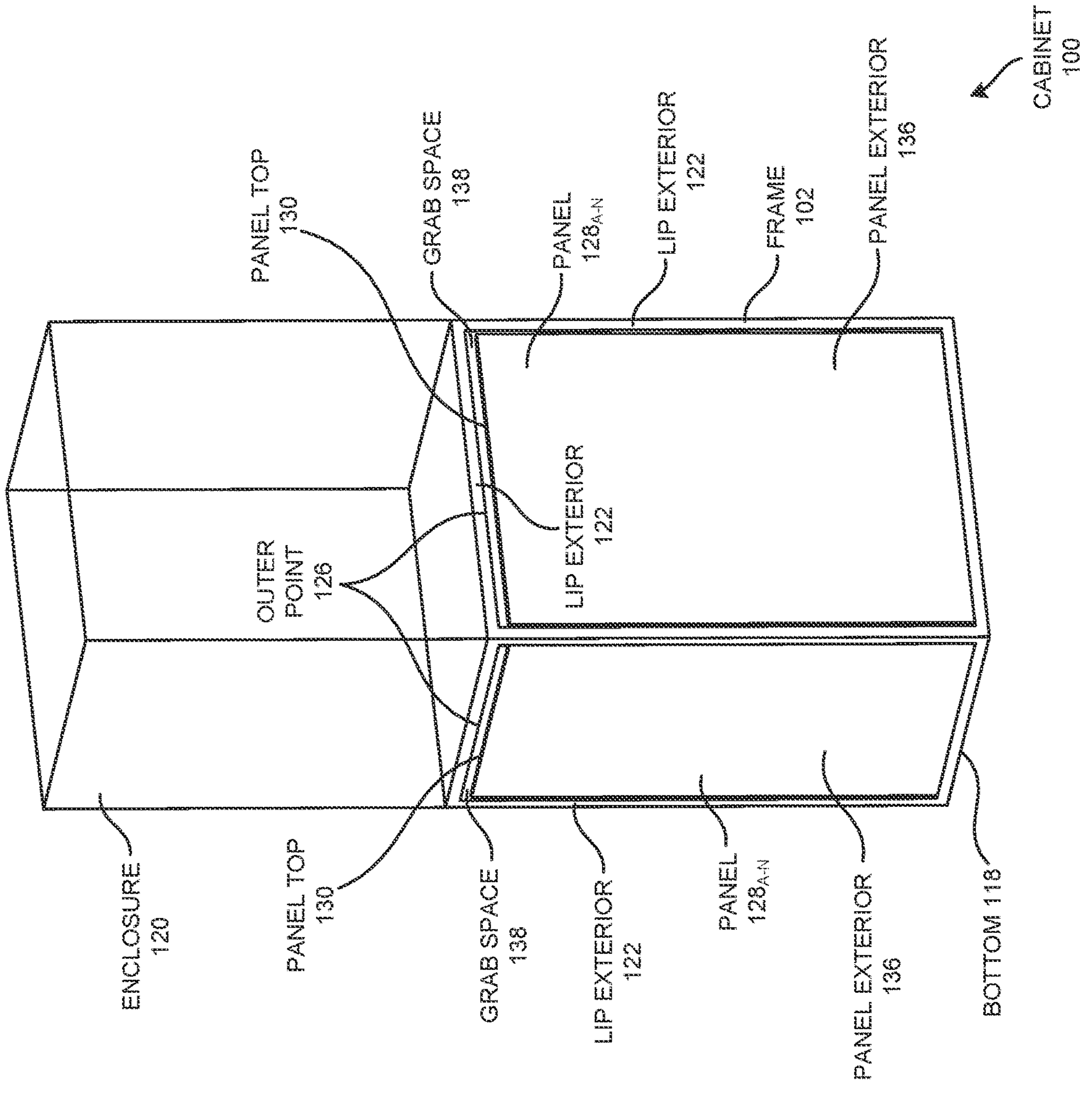
FIG. 4 is a schematic illustration of the cabinet of FIGS. 1-3 wherein the panels are attached to the cabinet, according to one embodiment.

FIG. 4 is a schematic illustration of the cabinet 100 of FIGS. 1-3 wherein the panels 128A-N are attached to the cabinet 100, according to one embodiment. FIG. 4 discloses the cabinet 100, the bottom 118, the enclosure 120, the lip exterior 122, the outer point 126, the panels 128A-N (e.g. the at least one panel), the panel top 130, the panel exterior 136, and/or the grab space 138. According to one embodiment, as shown in FIG. 4, the panels 128A-N may be less tall than the space from the bottom 118 to the outer point 126 of the frame lip 112 of the frame 102. With the panels 128A-N being less tall than the space from the bottom 118 to the outer point 126, the grab space 138 may be formed between the outer point 126 and the panel top 130.

The grab space 138 may be an area wherein a user can grab one of the panels 128A-N and/or pull it away from the frame 102 of the cabinet 100, thus breaking the magnetic connection between the panel interior 134 and the magnets 116A-N. To replace the panels 128A-N back onto the frame 102, the user may simply guide the panel 128 between the jambs and place the panel interior 134 into connection with the magnets 116A-N.

Figure 5:
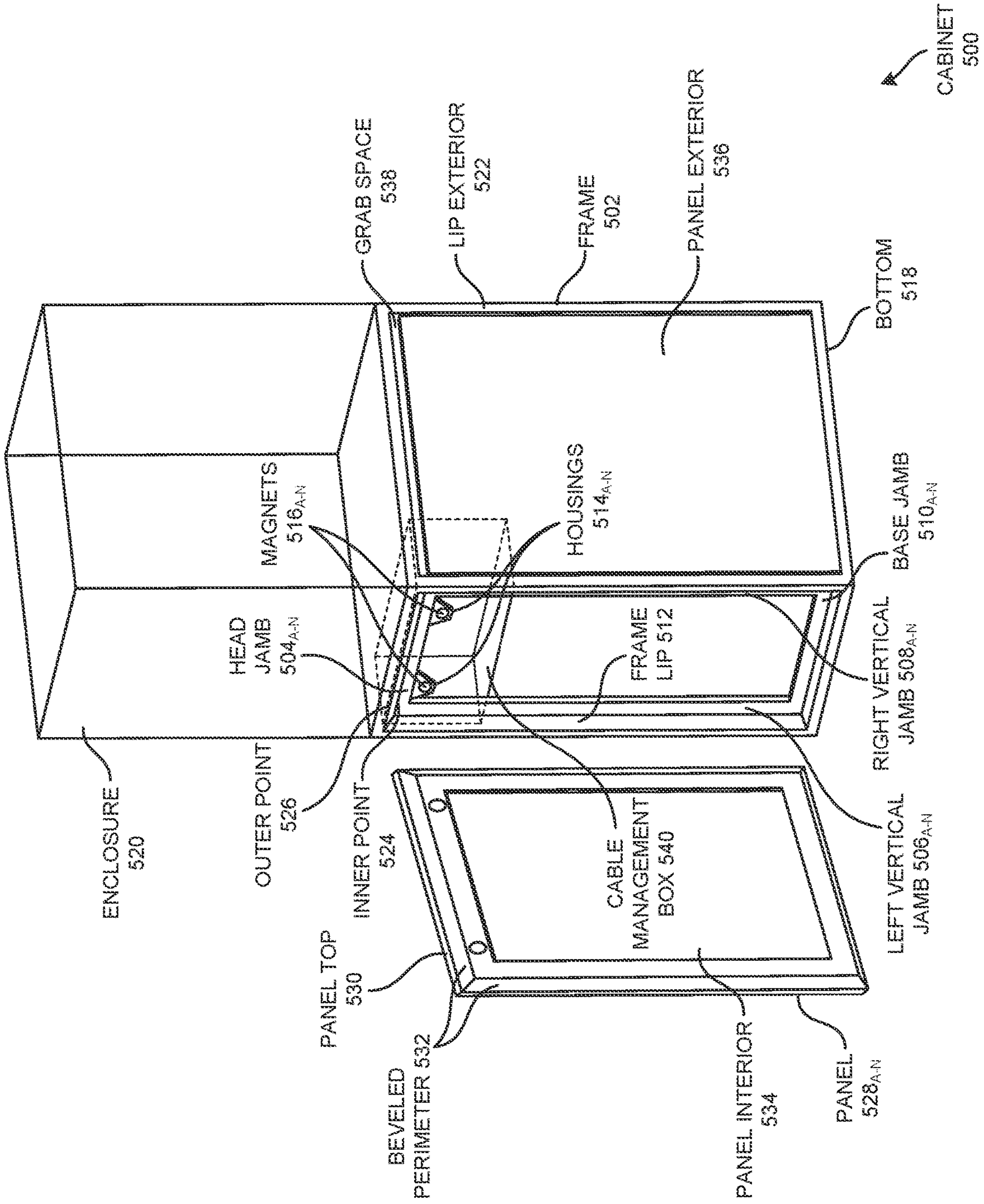
FIG. 5 is an alternative embodiment of the cabinet of FIGS. 1-4 wherein the cabinet comprises a cable management box, according to one embodiment.

FIG. 5 is an alternative embodiment of the cabinet 500 of FIGS. 1-4 wherein the cabinet 500 comprises a cable management box 528, according to one embodiment. FIG. 5 discloses a cabinet 500, a frame 502, at least one head jamb 504A-N, at least one left vertical jamb 506A-N, at least one vertical jamb 508A-N, at least one base jamb 510A-N, a frame lip 512, a plurality of housings 514A-N, a plurality of magnets 516A-N, a bottom 518, an enclosure 520, a lip exterior 522, an inner point 524, an outer point 526, at least one panel 528A-N, a panel top 530, a beveled perimeter 532, a panel interior 534, a panel exterior 536, a grab space 538, and a cable management box 540.

The cabinet 500 may comprise the frame 502 and/or the at least one panel 528A-N. The cabinet 500 may be designed as a modular and/or versatile base suitable for supporting enclosures 520 aquariums, terrariums, and/or paludariums. The cabinet 500 may be composed of various materials including but not limited to metal, wood, plastic, and/or other elements to provide a support structure for the enclosure 520. The frame 502 may comprise the at least one head jamb 504A-N, the at least one left vertical jamb 506A-N, the at least one right vertical jamb 508A-N, the at least one base jamb 510A-N, and/or the frame lip 512. The frame 502 and/or all of its components may be constructed from a single mold process. The frame 502 may be constructed from durable materials including but not limited to metal, wood, plastic and/or other elements to provide a robust support structure for the enclosure 520.

The at least one head jamb 504A-N of the frame 502 may be positioned toward the top portion of the frame 502 of the cabinet 500. The at least one head jamb 504A-N may be adjacent to and/or below the frame lip 512. The at least one head jamb 504A-N may be connected to the at least one left vertical jamb 506A-N and/or the at least one right vertical jamb 508A-N. The at least one left vertical jamb 506A-N of the frame 502 and/or the at least one right vertical jamb 508A-N of the frame 502 may be used to at least partially define corners of the cabinet 100. The at least one left vertical jamb 506A-N and/or the at least one right vertical jamb 508A-N may be adjacent and/or interior to the frame lip 512.

The at least one base jamb 510A-N may be a part of and/or near the bottom 100 to anchor and/or stabilize the base. The at least one base jamb 510A-N may be adjacent, above, and/or interior to the frame lip 512. The at least one base jamb 510A-N may be connected to the at least one left vertical jamb 506A-N and/or the at least one right vertical jamb 508A-N. The frame lip 512 may be a part of the frame 502 of the cabinet 500. The frame lip 512 may be designed to provide a seamless edge around the the at least one head jamb 504A-N, the at least one left vertical jamb 506A-N, the at least one right vertical jamb 508A-N, and/or the at least one base jamb 510A-N of the frame 502. The frame lip 512 may comprise the inner point 524, the outer point 526, and/or the lip exterior 522.

The plurality of housings 514A-N may be attached to the at least one head jamb 504A-N of the frame 502. The plurality of housings 514A-N may be comprised of polycarbonate, acrylonitrile butadiene styrene, polyethylene, polypropylene, polyvinyl chloride, polyethylene terephthalate, polyurethane, silicone, thermoplastic elastomers, thermoplastic polyurethane and/or any other material that may provide resistance to damage and/or oxidation. The plurality of housings 514A-N may accommodate the plurality of magnets 516A-N. Each one of the plurality of housings 514A-N may encase at least one of the plurality of magnets 516A-N. The plurality of magnets 516A-N may be strategically placed within the housings 514A-N to securely attach the panels 528A-N to the cabinet 500 without the need for hardware including but not limited to hinges and/or sliding brackets.

The bottom 518 may be the lowest most portion of the cabinet 500. The bottom 518 may be a part of and/or connect to the at least one base jamb 510A-N of the frame 502 and/or the frame lip 512 of the frame 502. The bottom 518 may be a separate structure from the at least one base jamb 510A-N of the frame 502 and/or the frame lip 512 of the frame 502.

The enclosure 520 may be an aquarium, terrarium, paludarium, and/or any other enclosure used to display items including but not limited to plants, animals, rocks, artifacts, and/or memorabilia. The lip exterior 522 may be the most exterior portion of the frame lip 512 of the frame 502. The lip exterior 522 may be substantially flat and may encircle the frame lip 512 of the frame 502. The inner point 524 and/or the outer point 526 may be points of the frame lip 512. The inner point 524 may be the innermost portion of the frame lip 512 and/or may be adjacent to the various jambs of the frame 502. The outer point 526 may be the outermost portion of the frame lip 512 and/or may be adjacent to the lip exterior 522 of the frame 502. The inner point 524 and/or the outer point 526 may be obliquely angled from one another, which may create a beveled appearance for the frame 502.

The at least one panel 528A-N may be made of a magnetizable material and may be removably attached to the cabinet 500 via magnets 516A-N. The at least one panel 528A-N may be a door-like structure that may substantially form the sides of the cabinet 500 and/or substantially enclose the interior of the cabinet 500. The at least one panel 528A-N may be completely removed from the cabinet 500 which may allow for a user to view and/or work within the interior of the cabinet 500. The panel top 530 may be the uppermost portion of each of the at least one panel 528A-N and/or may be above the beveled perimeter 532 of the upper-horizontal portion of the panel 528. The beveled perimeter 532 may be an obliquely angled perimeter of the at least one panel 528A-N and may form a ninety-degree angle with the frame lip 512 of the frame 502 when the panel 528 is attached to the cabinet 500 via the magnets 516A-N.

The panel interior 534 may be the inside portion of the at least one panel 528A-N and/or may face toward the interior of the cabinet 500 when the panel 528 is attached to the cabinet 500. The panel interior 534 may magnetically connect to the plurality of magnets 516A-N. The panel exterior 536 may be the outermost portion of the at least one panel 528A-N and may face away the interior of the cabinet 500 when the panel 528 may be attached to the cabinet 500. The grab space 538 may be an open space above the panel top 530 and below the frame lip 512 of the at least one head jamb 504A-N. The cable management box 540 may be a storage area installed within the cabinet 500 wherein various cables, components, and/or other equipment may be stored and/or organized. The cable management box 540 may be anywhere within the cabinet 500. The cable management box 540 may comprise a separate closing door that is separate from the other components of the cabinet 500.

According to one embodiment, FIG. 5 discloses the cabinet 500 that may support the enclosure 520. The enclosure 520 may be a terrarium, an aquarium, and/or a paludarium. The cabinet 500 may be a substantially cuboid shape. The cabinet 500 may comprise the frame 502 of the cabinet 500. The frame 502 may comprise the at least one head jamb 504A-N, the at least one left vertical jamb 506A-N, the at least one right vertical jamb 508A-N, and/or the at least one base jamb 510A-N. The at least one head jamb 504A-N may be at the top-horizontal portion of the frame 502. The at least one left vertical jamb 506A-N and/or the at least one right vertical jamb 508A-N may connect to a corresponding head jamb 504A-N.

The at least one left vertical jamb 506A-N and/or the at least one right vertical jamb 508A-N may further attach to a corresponding base jamb 510 wherein when connected, the at least one head jamb 504A-N, the at least one left vertical jamb 506A-N, the at least one right vertical jamb 508A-N, and/or the at least one base jamb 510A-N may form the frame 502 of the cabinet 500. The cabinet 500 may further comprise the plurality of housings 514A-N that may be attached to the at least one head jamb 504A-N. At least two housings 514A-N may be attached to each of the head jambs 504A-N. Furthermore, the at least one magnet 516A-N of the plurality of magnets 516A-N may be encased in the plurality of housings 514A-N.

Each housing 514A-N may encase at least one magnet 516A-N. A plurality of screws (not shown) may attach the plurality of housings 514A-N to the at least one head jamb 504A-N of frame 502. At least one of the plurality of screws (not shown) may attach at least one housing 514A-N to the at least one head jamb 504A-N. The plurality of screws (not shown) may be at least partially encased within the plastic housings 514A-N. The cabinet 500 may further comprise at least one panel 528A-N that may be removably attached to the to the cabinet 500 by magnetically connecting the panel 528A-N to the magnets 516A-N encased within the plastic housings 514A-N.

The cabinet 500 may comprise the frame lip 512 on the exterior of the at least one head jamb 504A-N, the at least one left vertical jamb 506A-N, and/or the at least one right vertical jamb 508A-N. The frame lip 512 may comprise the outer point 526 and/or the inner point 524. The outer point 526 and/or the inner point 524 of the frame lip 512 may be at a substantially oblique angle from each other. The frame 502, frame lip 512, and/or the at least one panel 528A-N may be comprised of at least one of aluminum, stainless steel, and/or galvanized steel to prevent rusting.

The cabinet 500 may comprise the grab space 538 formed at an area substantially between the outer point 526 of the frame lip 512 and/or the panel top 530. The at least one panel 528A-N may be shorter than the distance from the bottom 518 of the cabinet 500 and/or the outer point 526 of the frame lip 512 to form the grab space 538 to allow for a user to grab the panel 528A-N and/or pull the panel away from the magnets 516A-N. The at least one panel 528A-N of the cabinet 500 may comprise the beveled perimeter 532 of the at least one panel 528A-N that may be formed on the edge of the panel 528A-N at an oblique orientation. The beveled perimeter 532 may be substantially between the panel interior 534 and/or the panel exterior 536. The beveled perimeter 532 and the frame lip 512 may form a ninety degree angle when the at least one panel 528A-N is attached to the cabinet 500 by the magnets 516A-N. Furthermore, the lip exterior 522 of the frame lip 512 and the panel exterior 536 may be substantially planar when the at least one panel 528A-N is attached to the frame 502. The at least one panel 528A-N may attach to the magnets 516A-N at an area below the beveled perimeter 532 on the panel interior 534.

The cabinet 500 may further comprise the cable management box 540 which may be affixed within the cabinet 500. The cable management box 540 may be affixed anywhere within the cabinet 540 and/or may be accessible by removing any of the panels 528A-N. The cable management box 540 may be accessible by removing the at least one panel 528A-N.

Although FIG. 5 discloses at least one panel 528A-N removed from the cabinet 500, the cabinet 500 may comprise any number of panels 528A-N and thus any number of housings 514A-N, magnets 516A-N, head jambs 504A-N, left vertical jambs 506A-N, right vertical jambs 508A-N, base jambs 510A-N, housings 514A-N, and/or magnets 516A-N. Furthermore, although FIG. 5 discloses a substantially cuboid shaped cabinet 500, the cabinet 500 may be any polyhedron comprising various configurations.

Figure 6:
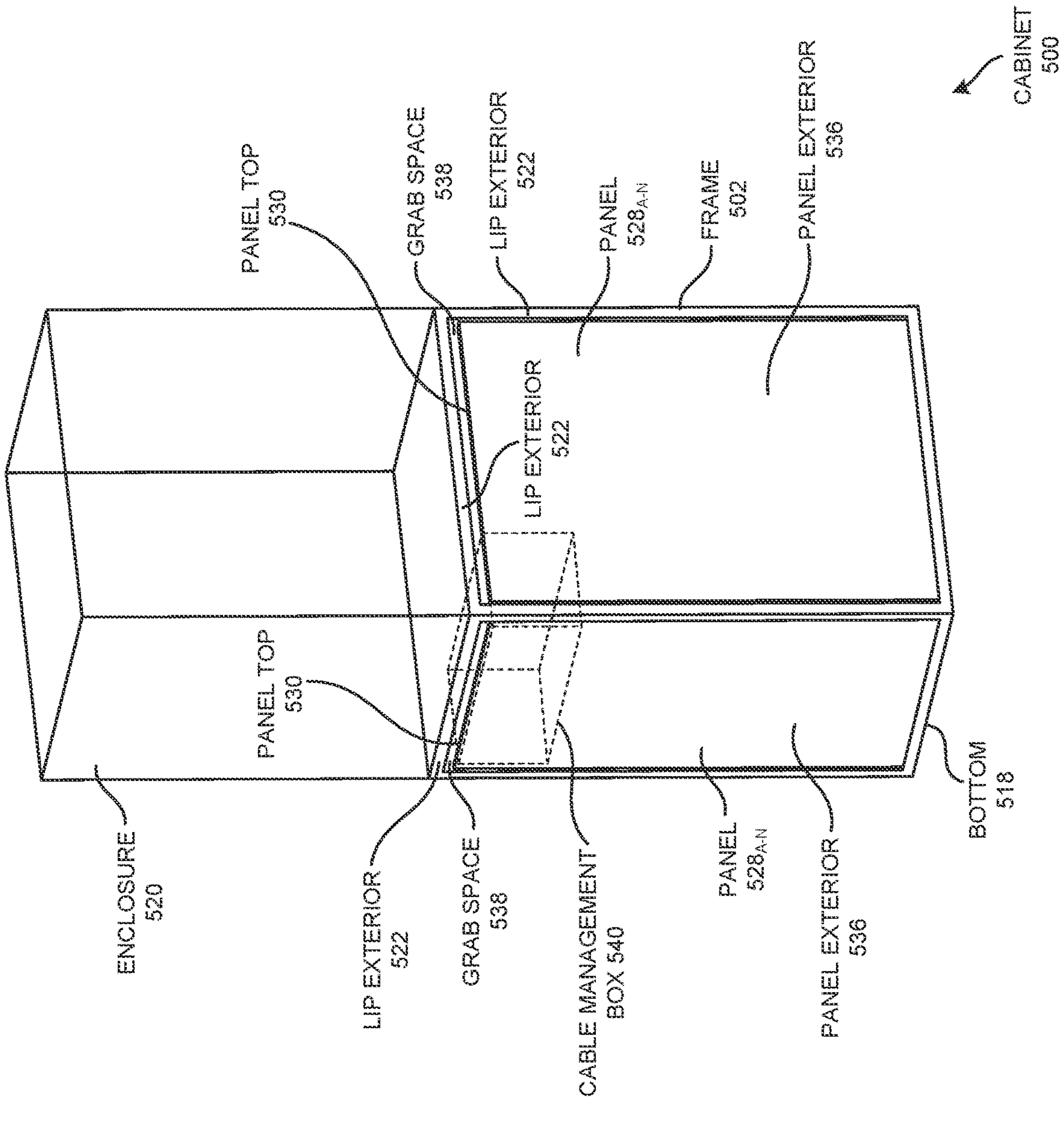
FIG. 6 is a schematic illustration of the cabinet of FIG. 5 wherein the at least one panel is shown attached to the cabinet with the cable management box within the cabinet, according to one embodiment.

FIG. 6 is a schematic illustration of the cabinet 500 of FIG. 5 wherein the at least one panel 528A-N is shown attached to the cabinet 500 with the cable management box 540 within the cabinet 500, according to one embodiment.

FIG. 6 discloses the cabinet 500, the frame 502, the bottom 518, the enclosure 520, the lip exterior 522, the at least one panel 528A-N, the panel top 530, the panel exterior 536, the grab space 538, and the cable management box 540.

According to one embodiment, FIG. 6 discloses the panels 528A-N attached to the cabinet 500. The panels 528A-N may be less tall than the space from the bottom 518 to the outer point 526 of the frame lip 512 of the frame 502. With the panels 528A-N being less tall than the space from the bottom 518 to the outer point 526, the grab space 538 may be formed between the outer point 526 and the panel top 530.

The grab space 538 may be an area wherein a user can grab one of the panels 528A-N, and pull it away from the frame 502 of the cabinet 500, thus breaking the magnetic connection between the panel interior 534 and the magnets 516A-N. To replace the panels 528A-N back onto the frame 502, the user may simply guide the panel 528 between the jambs and place the panel interior 534 into connection with the magnets 516A-N.

The cabinet 500 may further comprise the cable management box 540 wherein various components including wiring, fuses, pumps, circuit breakers, and/or other equipment may be organized and/or stored. The cable management box 540 may be anywhere within the cabinet 500.

Figure 7:
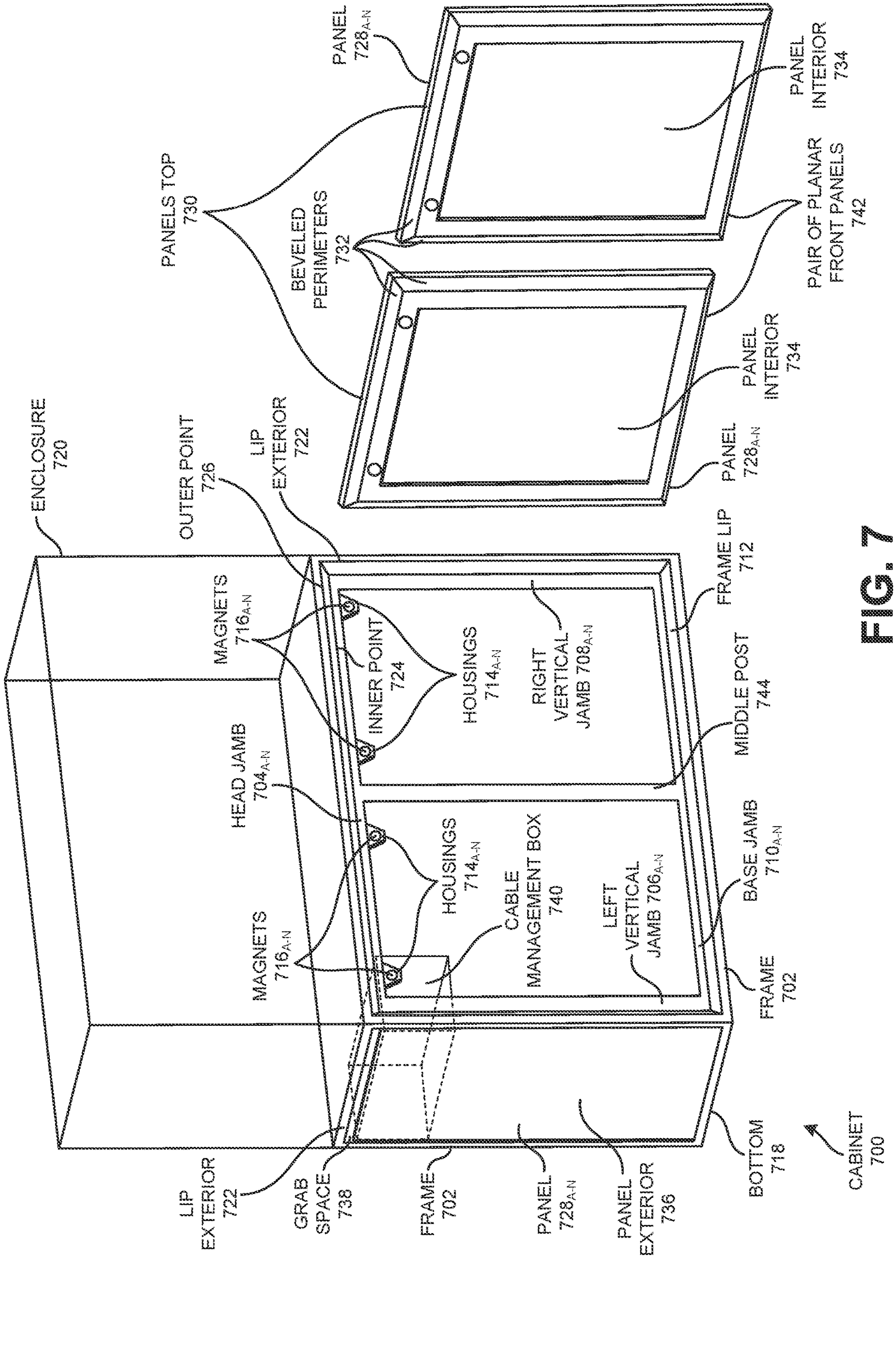
FIG. 7 is an alternative embodiment of the cabinet of FIGS. 1-6 wherein the cabinet is elongated and comprises a pair of planar front panels and a middle post, according to one embodiment.

FIG. 7 is an alternative embodiment of the cabinet 700 of FIGS. 1-6 wherein the cabinet 700 is elongated and comprises a pair of planar front panels 742 and a middle post 744, according to one embodiment. FIG. 7 discloses a cabinet 700, a frame 702, at least one head jamb 704A-N, at least one left vertical jamb 706A-N, at least one vertical jamb 708A-N, at least one base jamb 710A-N, a frame lip 712, a plurality of housings 714A-N, a plurality of magnets 716A-N, a bottom 718, an enclosure 720, a lip exterior 722, an inner point 724, an outer point 726, at least one panel 728A-N, a panel top 730, a beveled perimeter 732, a panel interior 734, a panel exterior 736, a grab space 738, a cable management box 740, a pair of planar front panels 742, and a middle post 744.

The cabinet 700 may comprise the frame 702 and/or the at least one panel 728A-N. The cabinet 700 may be designed as a modular and/or versatile base suitable for supporting enclosures 720 aquariums, terrariums, and/or paludariums. The cabinet 700 may be composed of various materials including but limited to metal, wood, plastic, and/or other elements to provide a robust support structure for the enclosure 720. The frame 702 may comprise the at least one head jamb 704A-N, the at least one left vertical jamb 706A-N, the at least one right vertical jamb 708A-N, the at least one base jamb 710A-N, and the frame lip 712. The frame 702 and all of its components may be constructed from a single mold process. The frame 702 may be constructed from durable materials including but not limited to metal, wood, plastic and/or other elements to provide a robust support structure for the enclosure 720.

The at least one head jamb 704A-N of the frame 702 may be positioned toward the top portion of the frame 702 of the cabinet 700. The at least one head jamb 704A-N may be adjacent to and/or below the frame lip 712. The at least one head jamb 704A-N may be connected to the at least one left vertical jamb 706A-N and the at least one right vertical jamb 708A-N. The at least one left vertical jamb 706A-N of the frame 702 and/or the at least one right vertical jamb 708A-N of the frame 702 may be used to at least partially define corners of the cabinet 100. The at least one left vertical jamb 706A-N and/or the at least one right vertical jamb 708A-N may be adjacent to the frame lip 712 and/or interior to.

The at least one base jamb 710A-N may be a part of and/or near the bottom 100 to anchor and/or stabilize the base. The at least one base jamb 710A-N may be adjacent, above, and/or interior to the frame lip 712. The at least one base jamb 710A-N may be connected to the at least one left vertical jamb 706A-N and/or the at least one right vertical jamb 708A-N. The frame lip 712 may be a part of the frame 702 of the cabinet 700. The frame lip 712 may be designed to provide a seamless edge around the the at least one head jamb 704A-N, the at least one left vertical jamb 706A-N, the at least one right vertical jamb 708A-N, and/or the at least one base jamb 710A-N of the frame 702. The frame lip 712 may comprise the inner point 724, the outer point 726, and/or the lip exterior 722.

The plurality of housings 714A-N may be attached to the at least one head jamb 704A-N of the frame 702. The plurality of housings 714A-N may be comprised of polycarbonate, acrylonitrile butadiene styrene, polyethylene, polypropylene, polyvinyl chloride, polyethylene terephthalate, polyurethane, silicone, thermoplastic elastomers, thermoplastic polyurethane and/or any other material that may provide resistance to damage and/or oxidation.

The plurality of housings 714A-N may accommodate the plurality of magnets 716A-N. Each one of the plurality of housings 714A-N may encase at least one of the plurality of magnets 716A-N. The plurality of magnets 716A-N may be strategically placed within the housings 714A-N to securely attach the panels 728A-N to the cabinet 700 without the need for hardware including but not limited to hinges and/or sliding brackets. The bottom 718 may be the lowest most portion of the cabinet 700. The bottom 718 may be a part of and/or connect to the at least one base jamb 710A-N of the frame 702 and/or the frame lip 712 of the frame 702. The bottom 718 may be a separate structure from the at least one base jamb 710A-N of the frame 702 and/or the frame lip 712 of the frame 702.

The enclosure 720 may be an aquarium, terrarium, paludarium, and/or any other enclosure used to display items including but not limited to plants, animals, rocks, artifacts, and/or memorabilia. The lip exterior 722 may be the most exterior portion of the frame lip 712 of the frame 702. The lip exterior 722 may be substantially flat and may encircle the frame lip 712 of the frame 702. The inner point 724 and/or the outer point 726 may be points of the frame lip 712. The inner point 724 may be the innermost portion of the frame lip 712 and/or may be adjacent to the various jambs of the frame 702. The outer point 726 may be the outermost portion of the frame lip 712 and/or may be adjacent to the lip exterior 722 of the frame 702. The inner point 724 and the outer point 726 may be obliquely angled from one another, which may create a beveled appearance for the frame 702.

The at least one panel 728A-N may be made of a magnetizable material and may be removably attached to the cabinet 700 via magnets 716A-N. The at least one panel 728A-N may be a door-like structure that may substantially form the sides of the cabinet 700 and/or substantially enclose the interior of the cabinet 700. The at least one panel 728A-N may be completely removed from the cabinet 700 which may allow for a user to view and/or work within the interior of the cabinet 700. The panel top 730 may be the uppermost portion of each of the at least one panel 728A-N and/or may be above the beveled perimeter 732 of the upper-horizontal portion of the panel 728. The beveled perimeter 732 may be an obliquely angled perimeter of the at least one panel 728A-N and may form a ninety-degree angle with the frame lip 712 of the frame 702 when the panel 728 is attached to the cabinet 700 via the magnets 716A-N.

The panel interior 734 may be the inside portion of the at least one panel 728A-N and may face toward the interior of the cabinet 700 when the panel 728 is attached to the cabinet 700. The panel interior 734 may magnetically connect to the plurality of magnets 716A-N. The panel exterior 736 may be the outermost portion of the at least one panel 728A-N and may face away the interior of the cabinet 700 when the panel 728 is attached to the cabinet 700. The grab space 738 may be an open space above the panel top 730 and below the frame lip 712 of the at least one head jamb 704A-N.

The cable management box 740 may be a storage area installed within the cabinet 700 wherein various cables, components, and/or other equipment may be stored and/or organized. The pair of planar panels 742 may be two individual panels 728A-N that may enclose one or more of the wide-sides of a rectangularly shaped cuboid cabinet 700. The middle post 744 may be a vertically oriented support substantially in the center of one or more of the wide-sides of a rectangularly shaped cuboid cabinet 700. The middle post 744 may be substantially adjacent to one or more of the panels 728A-N that comprise the pair of planar panels 742 when one or more of the panels 728A-N are attached to the cabinet 700.

According to one embodiment, FIG. 7 discloses the cabinet 700 that may support at least one of a terrarium, an aquarium, and/or a paludarium. The cabinet 700 may be a cuboid shape. The cabinet 700 may comprise the frame 702 of the cabinet 700. The frame 702 may comprise the plurality of head jambs 704A-N, the plurality of left vertical jambs 706A-N, the plurality of right vertical jambs 708A-N, and/or the plurality of base jambs 710A-N. Each of the head jambs 704A-N may be at the top-horizontal portion of the frame 702. Each left vertical jamb 706 and/or each right vertical jamb 708 may connect to a corresponding head jamb 104. Each left vertical jamb 706 and/or each right vertical jamb 708 may further attach to a corresponding base jamb 110 wherein when connected, the plurality of head jambs 704A-N, the plurality of left vertical jambs 706A-N, the plurality of right vertical jambs 708A-N, and/or the plurality of base jambs 710A-N may form the frame 702 of the cabinet 700.

The cabinet may further comprise the plurality of housings 714A-N that may be attached to each of the head jambs 704A-N. At least two housings 714A-N may be attached to each of the head jambs 704A-N. Furthermore, the plurality of magnets 716A-N may be encased in the plurality of housings 714A-N. Each housing 714A-N encases at least one magnet 716A-N. A plurality of screws (not shown) may attach the plurality of housings 714A-N to the plurality of head jambs 704A-N of frame 702. At least one of the plurality of screws (not shown) may attach at least one housing 714A-N to at least one head jamb 704A-N. The plurality of screws (not shown) may be at least partially encased within the plastic housings 714A-N. The plurality of screws (not shown) may be made of at least one of stainless steel, brass, titanium, and/or aluminum.

The cabinet 700 may further comprise the plurality of panels 728A-N that may be removably attached to the to the cabinet 700 by magnetically connecting the panels 728A-N to the magnets 716A-N encased within the plastic housings 714A-N. The cabinet 700 may comprises the frame lip 712 on the exterior of each of the head jambs 704A-N, each of the left vertical jambs 706A-N, and/or each of the right vertical jambs 708A-N. The frame lip 712 may comprise an outer point 726 and/or an inner point 724. The outer point 726 and the inner point 724 of the frame lip 712 may be at a substantially oblique angle from each other.

The cabinet 700 may comprise the grab space 738 formed at an area substantially between the outer point 726 of the frame lip 712 and the panel top 730. The panels 728A-N may be shorter than the distance from the bottom 718 of the cabinet 700 and the outer point 726 of the frame lip 712 to form the grab space 738 to allow for a user to grab at least one of the plurality of panels 728A-N substantially near the panel top 730 and pull the panel 728A-N away from the magnets 716A-N.

The panels 728A-N of the cabinet 700 may comprise the beveled perimeter 732 of the plurality of panels 728A-N that may be formed on the panels 728A-N at an oblique orientation. The beveled perimeter 732 may be substantially between the panel interior 734 and the panel exterior 736. The beveled perimeter 732 and the frame lip 712 may form a ninety degree angle when the panel 728A-N is attached to the cabinet 700 by the magnets 716A-N. Furthermore, the lip exterior 722 of the frame lip 712 and the panel exterior 736 may be substantially planar when at least one panel 728A-N is attached to the frame 702. The panels 728A-N may attach to the magnets 716A-N at an area below the beveled perimeter 732. The frame 702, frame lip 712, and/or the panels 728A-N may be comprised of at least one of aluminum, stainless steel, and/or galvanized steel to prevent rusting.

The cabinet 700 may further comprise the cable management box 740 affixed within the cabinet 700 that may be accessible through the interior of the cabinet 700. The cable management box 740 may be affixed anywhere within the cabinet 740 and may be accessible by removing any of the panels 728A-N.

The cabinet 700 may further comprise the middle post 744 of the frame 702 to further reinforce the cabinet 700 when the cabinet 700 is in a substantially rectangular configuration. The middle post 744 may be a vertically running support that may be attached to the at least one base jamb 710A-N and/or the at least one head jamb 704A-N. The middle post 744 may be substantially halfway between one of the left vertical jambs 706A-N and one of the right vertical jambs 708A-N. The cabinet 700 may further comprise the pair of planar front panels 742. Both of the pair of planar front panels 742 may be adjacent to the middle post 744 which may make the cabinet 700 comprising the plurality of panels 728A-N, at least two panels 728A-N wide and/or one panel 728A-N deep.

As further disclosed in FIG. 7, the cabinet 700 may be in a rectangular-cuboid shaped polyhedron that may be two panels 728A-N (e.g. the pair of planar front panels 742) wide and one panel 728A-N deep. The panels 728A-N may be removably attached to provide a user access to the inside of the cabinet 700 without the need for hinges and/or other door hardware. The panels 728A-N may attach to the frame 702 of the cabinet 700 by magnetically connecting to the magnets 716A-N. Although FIG. 7 discloses three panels 728A-N, the cabinet 700 of FIG. 7 may comprise as little as one panel 728 and as many as six panels 728A-N.

When connected to the cabinet 700, the beveled perimeter 732 of the panels 728A-N may coalesce with the frame lip 712, forming a substantially ninety-degree angle. This ninety-degree angle may allow the panel exterior 736 to be substantially planar (e.g. flush) with the lip exterior 722 when the panels 728A-N are attached to the frame 702 of the cabinet 700.

In this two panel 728A-N wide configuration, the middle post 744 may be utilized. The middle post 744 may replace one of the left vertical jambs 706A-N and/or one of the right vertical jambs 708A-N. In this configuration, the innermost portions of the beveled perimeter 732 of pair of planar front panels 742 may not form a ninety degree angle with the middle post 744 as the middle post 744 may not have a frame lip 712 and/or any other sort of beveling, mitering, and/or angling. Due to this lack of angling, when one of the pair of planar front panels 742 is removed from the cabinet 700, the corresponding planar front panel 742 may be removed by grabbing the panel 728A-N from the side.

Figure 8:
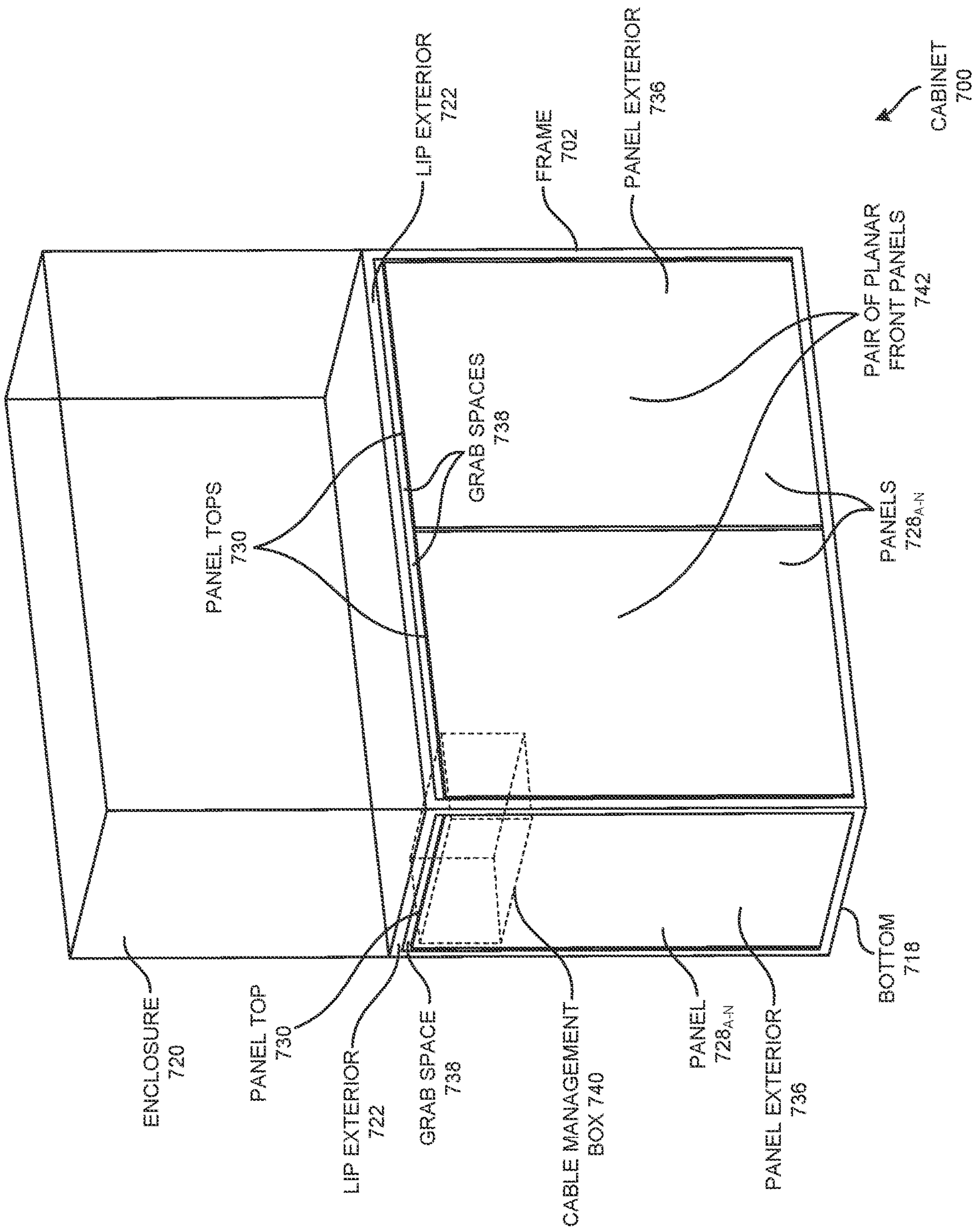
FIG. 8 is a schematic illustration of the cabinet of FIG. 7 wherein the pair of planar front panels are attached to the cabinet, according to one embodiment.

FIG. 8 is a schematic illustration of the cabinet 700 of FIG. 7 wherein the pair of planar front panels 742 are attached to the cabinet 700, according to one embodiment. FIG. 8 discloses the cabinet 700, the bottom 718, the enclosure 720, the lip exterior 722, the panels 728A-N, the panel top 730, the panel exterior 736, the grab space 738, the cable management box 740, and the pair of planar front panels 742.

According to one embodiment, FIG. 8 discloses the panels 728A-N attached to the cabinet 700. The panels 728A-N may be less tall than the space from the bottom 718 to the outer point 726 of the frame lip 712 of the frame 702. With the panels 728A-N being less tall than the space from the bottom 718 to the outer point 726, the grab space 738 may be formed between the outer point 726 and the panel top 730.

The grab space 738 may be an area wherein a user can grab one of the panels 728A-N, and pull it away from the frame 702 of the cabinet 700, thus breaking the magnetic connection between the panel interior 734 and the magnets 716A-N. To replace the panels 728A-N back onto the frame 702, the user may simply guide the panel 728 between the jambs and place the panel interior 734 into connection with the magnets 716A-N.

The cabinet 700 may further comprise the cable management box 740 wherein various components including wiring, fuses, pumps, circuit breakers, and/or other equipment may be organized and/or stored. The cable management box 740 may be anywhere within the cabinet 700. The cable management box 740 may be accessible through the interior of the cabinet 700.

Figure 9:
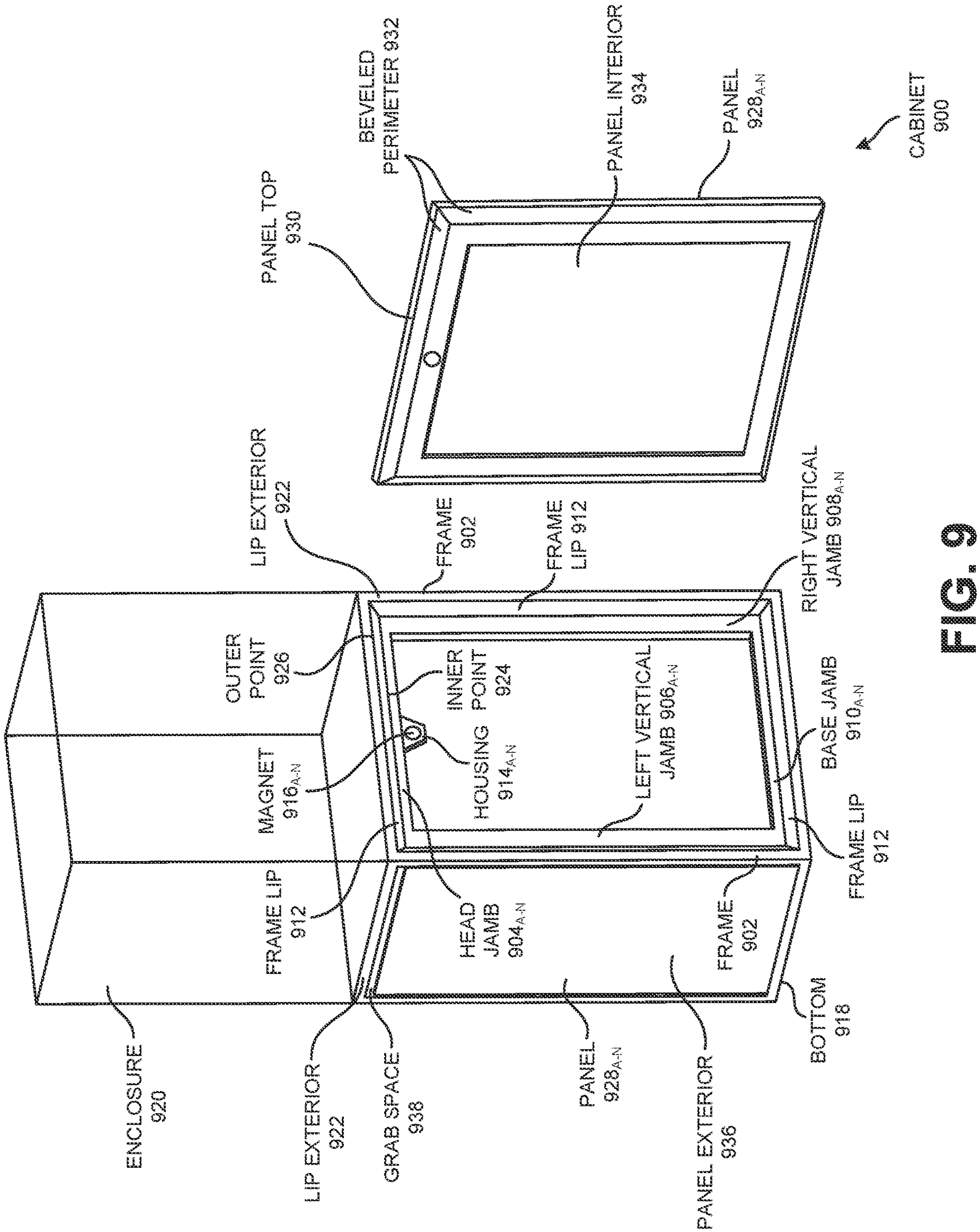
FIG. 9 is an alternative embodiment of the cabinet of FIGS. 1-8 wherein the at least one head jamb of the frame of the cabinet comprise one housing, according to one embodiment.

FIG. 9 is an alternative embodiment of the cabinet 900 of FIGS. 1-8 wherein at least one head jamb 906A-N of the frame 902 of the cabinet 900 comprises at least one housing 914A-N and/or at least one magnet 916A-N, according to one embodiment. FIG. 9 discloses a cabinet 900, a frame 902, at least one head jamb 904A-N, at least one left vertical jamb 906A-N, at least one vertical jamb 908A-N, at least one base jamb 910A-N, a frame lip 912, at least one housing 914A-N, at least one magnet 916A-N, a bottom 918, an enclosure 920, a lip exterior 922, an inner point 924, an outer point 926, at least one panel 928A-N, a panel top 930, a beveled perimeter 932, a panel interior 934, a panel exterior 936, a grab space 938, and The cabinet 900 may comprise the frame 902 and/or the at least one panel 928A-N. The cabinet 900 may be designed as a modular and/or versatile base suitable for supporting enclosures 920 aquariums, terrariums, and/or paludariums. The cabinet 900 may be composed of various materials including but limited to metal, wood, plastic, and/or other elements to provide a robust support structure for the enclosure 920. The frame 902 may comprise the at least one head jamb 904A-N, the at least one left vertical jamb 906A-N, the at least one right vertical jamb 908A-N, the at least one base jamb 910A-N, and the frame lip 912. The frame 902 and all of its components may be constructed from a single mold process. The frame 902 may be constructed from durable materials including but not limited to metal, wood, plastic and/or other elements to provide a robust support structure for the enclosure 920.

The at least one head jamb 904A-N of the frame 902 may be positioned toward the top portion of the frame 902 of the cabinet 900. The at least one head jamb 904A-N may be adjacent to and/or below the frame lip 912. The at least one head jamb 904A-N may be connected to the at least one left vertical jamb 906A-N and the at least one right vertical jamb 908A-N. The at least one left vertical jamb 906A-N of the frame 902 and/or the at least one right vertical jamb 908A-N of the frame 902 may be used to at least partially define the cabinet's 900 corners. The at least one left vertical jamb 906A-N and the at least one right vertical jamb 908A-N may be adjacent to the frame lip 912 and/or interior to.

The at least one base jamb 910A-N may be a part of and/or near the bottom 918 to anchor and/or stabilize the base. The at least one base jamb 910A-N may be adjacent, above, and/or interior to the frame lip 912. The at least one base jamb 910A-N may be connected to the at least one left vertical jamb 906A-N and/or the at least one right vertical jamb 908A-N. The frame lip 912 may be a part of the frame 902 of the cabinet 900. The frame lip 912 may be designed to provide a seamless edge around the the at least one head jamb 904A-N, the at least one left vertical jamb 906A-N, the at least one right vertical jamb 908A-N, and/or the at least one base jamb 910A-N of the frame 902. The frame lip 912 may comprise the inner point 924, the outer point 926, and/or the lip exterior 922.

The at least one housing 914A-N may be attached to the at least one head jamb 904A-N of the frame 702. The at least one housing 914A-N may be comprised of polycarbonate, acrylonitrile butadiene styrene, polyethylene, polypropylene, polyvinyl chloride, polyethylene terephthalate, polyurethane, silicone, thermoplastic elastomers, thermoplastic polyurethane and/or any other material that may provide resistance to damage and/or oxidation. The at least one housing 914A-N may accommodate the at least one magnet 916A-N. The at least one magnet 916A-N may be strategically placed within the at least one housing 914A-N to securely attach the at least one panel 928A-N to the cabinet 900 without the need for hardware including but not limited to hinges and/or sliding brackets. The bottom 918 may be the lowest most portion of the cabinet 900. The bottom 918 may be a part of and/or connect to the at least one base jamb 910A-N of the frame 902 and/or the frame lip 912 of the frame 902. The bottom 918 may be a separate structure from the at least one base jamb 910A-N of the frame 902 and/or the frame lip 912 of the frame 902.

The enclosure 920 may be an aquarium, terrarium, paludarium, and/or any other enclosure used to display items including but not limited to plants, animals, rocks, artifacts, and/or memorabilia. The lip exterior 922 may be the most exterior portion of the frame lip 912 of the frame 902. The lip exterior 922 may be substantially flat and/or may encircle the frame lip 912 of the frame 902. The inner point 924 and the outer point 926 may be points of the frame lip 912. The inner point 924 may be the innermost portion of the frame lip 912 and/or may be adjacent to the various jambs of the frame 902. The outer point 926 may be the outermost portion of the frame lip 912 and/or may be adjacent to the lip exterior 922 of the frame 902. The inner point 924 and the outer point 926 may be obliquely angled from one another, which may create a beveled appearance for the frame 902.

The at least one panel 928A-N may be made of a magnetizable material and may be removably attached to the cabinet 900 via the at least one magnet 916A-N. The at least one panel 928A-N may be a door-like structure that may substantially form the sides of the cabinet 900 and/or substantially enclose the interior of the cabinet 900. The at least one panel 928A-N may be completely removed from the cabinet 900 which may allow for a user to view and/or work within the interior of the cabinet 900. The panel top 930 may be the uppermost portion of each of the at least one panel 928A-N and/or may be above the beveled perimeter 932 of the upper-horizontal portion of the panel 928. The beveled perimeter 932 may be an obliquely angled perimeter of the at least one panel 928A-N and/or may form a ninety-degree angle with the frame lip 912 of the frame 902 when the panel 928 is attached to the cabinet 900 via the at least one magnet 916A-N.

The panel interior 934 may be the inside portion of the at least one panel 928A-N and/or may face toward the interior of the cabinet 900 when the panel 928 is attached to the cabinet 900. The panel interior 934 may magnetically connect to the at least one magnet 916A-N. The panel exterior 936 may be the outermost portion of the at least one panel 928A-N and/or may face away the interior of the cabinet 900 when the panel 928 is attached to the cabinet 900. The grab space 938 may be an open space above the panel top 930 and/or below the frame lip 912 of the at least one head jamb 904A-N.

According to one embodiment, FIG. 9 discloses the cabinet 900 which may support the enclosure 920. The cabinet 900 may comprise the frame 902 which may provide the primary structural support for the cabinet 900. The cabinet 900 may further comprise the head jamb 904 (e.g. the at least one head jamb 904A-N) of the frame 902. The head jamb 904 of the frame 902 may be located at the top-horizontal portion of the frame 902. The frame 902 of the cabinet 900 may further comprise the vertical jamb (e.g. at least one left vertical jamb 906A-N and/or the at least one right vertical jamb 908A-N) of the frame 902 of the cabinet 900. The vertical jamb (e.g. at least one left vertical jamb 906A-N and/or at least one right vertical jamb 908A-N) may be attached to the head jamb 904 to provide stability for the cabinet 900. The frame 902 of the cabinet may further comprise the base jamb 910 (e.g. the at least one base jamb 910A-N) of the frame 902 of the cabinet 900. The base jamb 910 may be attached to the vertical jamb (e.g. at least one left vertical jamb 906A-N and/or at least one right vertical jamb 908A-N) to provide stability for the cabinet 900.

The cabinet 900 may further comprise the housing 914 (e.g. the at least one housing 914A-N). The housing 914 may be attached to the head jamb 904. The magnet 916 (e.g. the at least one magnet 916A-N) may be at least partially encased in the housing 914. The panel 928 (e.g. the at least one panel 928A-N) may be removably attached to the frame 902 by magnetically connecting to the magnet 916 encased within the housing 914. Furthermore, when the panel 928 is attached to the frame 902 by magnetic connection to the magnet 916, the panel 928 at least partially closes the cabinet 900.

The frame 902 of the cabinet 900 may further comprise the frame lip 912 that may be located on the exterior of at least one of the head jamb 904, the base jamb 910, and the vertical jamb (e.g. at least one left vertical jamb 906A-N and/or at least one right vertical jamb 908A-N). The frame lip 912 may comprise the outer point 926 and/or the inner point 924 which may form an oblique angle to each other. The frame lip 912 may further comprise the lip exterior 922 that may be the most exterior portion of the frame lip 912. The cabinet 900, the frame 902, the frame lip 912, and/or the panel 928 may be made of aluminum to provide resistance to rusting.

The cabinet 900 may further comprise the beveled perimeter 932 of the panel 928 that may be formed at an oblique orientation relative to the panel interior 934 and/or the panel exterior 936. The beveled perimeter 932 may be substantially between the panel interior 934 and/or the panel exterior 936. The beveled perimeter 932 and the frame lip 912 may form a ninety-degree angle when the panel 928 is attached to the cabinet 900 by the magnet 916. The lip exterior 922 and the panel exterior 936 may be substantially planar when the panel 928 is attached to the frame 902. The panel 928 may attach to the magnet 916 at an area below the beveled perimeter 932.

The cabinet may further comprise the grab space 912 formed at an area substantially between the outer point 926 of the frame lip 912 and/or the panel top 930. The panel 928 may be shorter than the distance from the bottom 918 of the cabinet 900 and/or the outer point 926 of the frame lip 912 which may allow for a user to grab the panel 928 and/or pull the panel 928 away from the magnet 916. The cabinet 900 may further comprise a cable management box (not shown) affixed within the cabinet 900 that is accessible through the interior of the cabinet 900.

Figure 10:
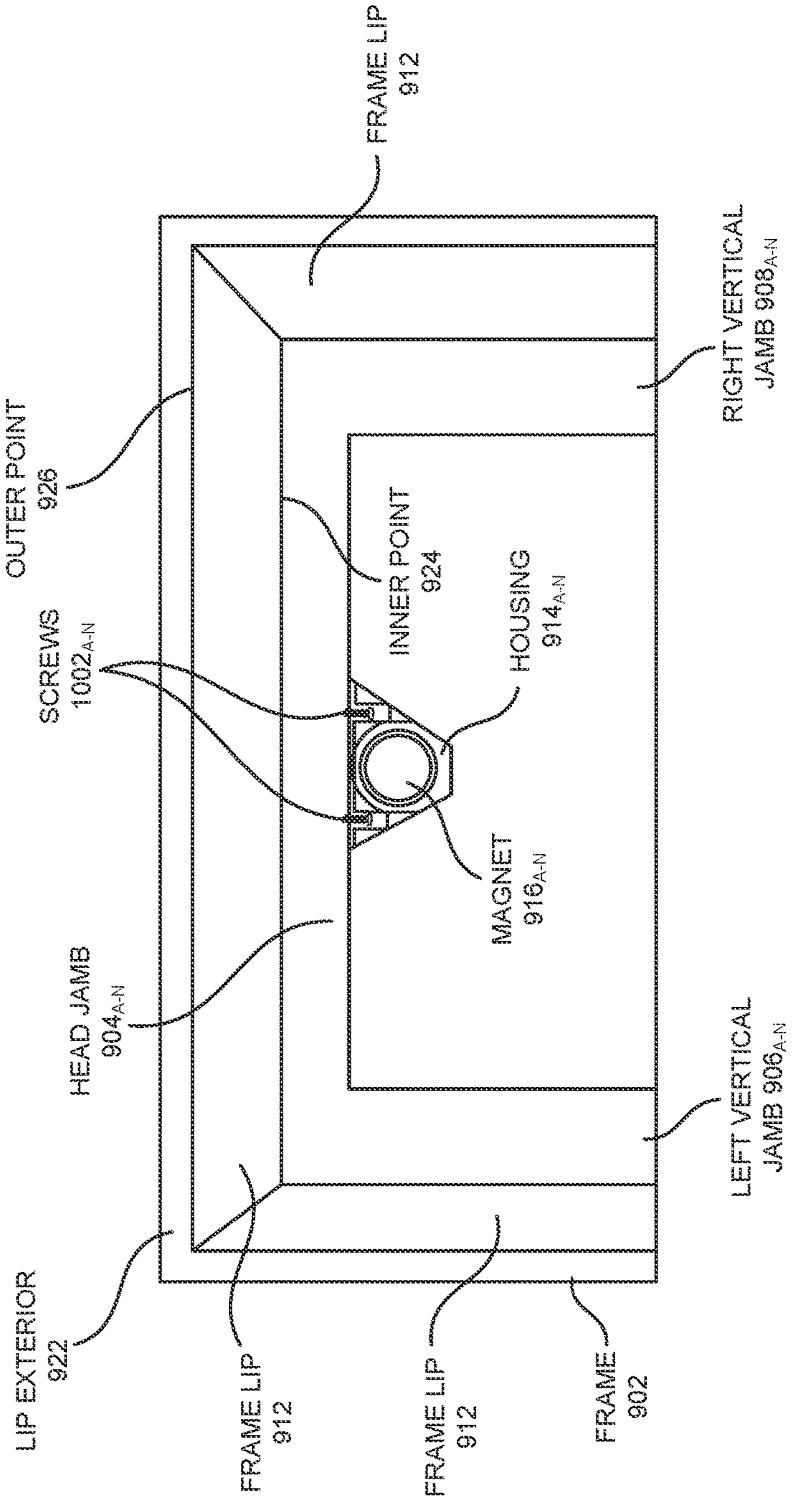
FIG. 10 is a schematic illustration of the upper portion of one side of the cabinet of FIG. 9 wherein one panel is removed from the cabinet, according to one embodiment.

FIG. 10 is a schematic illustration of the upper portion of one side of the cabinet 900 of FIG. 9 wherein one panel 928 is removed from the cabinet 900, according to one embodiment. FIG. 10 illustrates the frame 902, the at least one head jamb 904A-N, the at least one left vertical jamb 906A-N, the at least one right vertical jamb 908A-N, the frame lip 912, the at least one housing 914A-N, the at least one magnet 916A-N, the inner point 924, the outer point 926, and a plurality of screws 1002A-N.

The plurality of screws 1002A-N may be metallic screws used to attach the at least one housing 914A-N to the at least one head jamb 904A-N of the frame 902. The screws 1002A-N may be stainless steel screws, brass screws, bronze screws, titanium screws, aluminum screws, plastic screws, carbon fiber screws, galvanized steel screws, and/or precision machine screws for secure fitting in pre-drilled holes. The plurality of screws 1002A-N may further include self-tapping screws for creating their own thread as they are driven into the material, to ensure a tight and secure fit.

According to one embodiment, FIG. 10 discloses the frame 902 comprising the head jamb 904 (e.g. the at least one head jamb 904A-N) with the housing 914A-N (e.g. the plurality of housings 914A-N) attached. The housing 914 may be attached to the head jamb 904 via two screws 1002A-N (e.g. the plurality of screws 1002A-N). The two screws 1002A-N may be at least partially encased/housed within their corresponding housing 914. The two screws 1002A-N may be made of at least one of stainless steel, brass, titanium, and/or aluminum. The housing 914 may encase at least one of the magnets 916A-N to protect and/or suspend the at least one magnet 916A-N. Although the housing 914 is shown attached to the at least one head jamb 904, the housing 914 may be individually attached to any portion of the frame 902 with any amount of magnets 916A-N encased within. The housing 914 may be mounted to the frame 902 in any orientation so long as the magnets 916A-N encased within can sufficiently support the at least one panel 928A-N (not shown).

As further shown in FIG. 10, the frame 902 may further comprise the frame lip 912 and/or the frame exterior 922. The frame lip 912 may be a subcomponent of the frame 902 that extends at least partially outward from the frame 902 at a substantially oblique angle. The frame lip 912 may comprise the inner point 924, the outer point 926, and/or the lip exterior 922. The inner point 924 may be the portion of the frame lip 912 closest to the various jambs of the frame 902. The outer point may be the point where the oblique angle of the frame lip 912 ends its outward trajectory. The lip exterior 922 may be adjacent to the outer point 926 of the frame lip 912 and may be substantially flat relative to a vertical plane.

Figure 11:
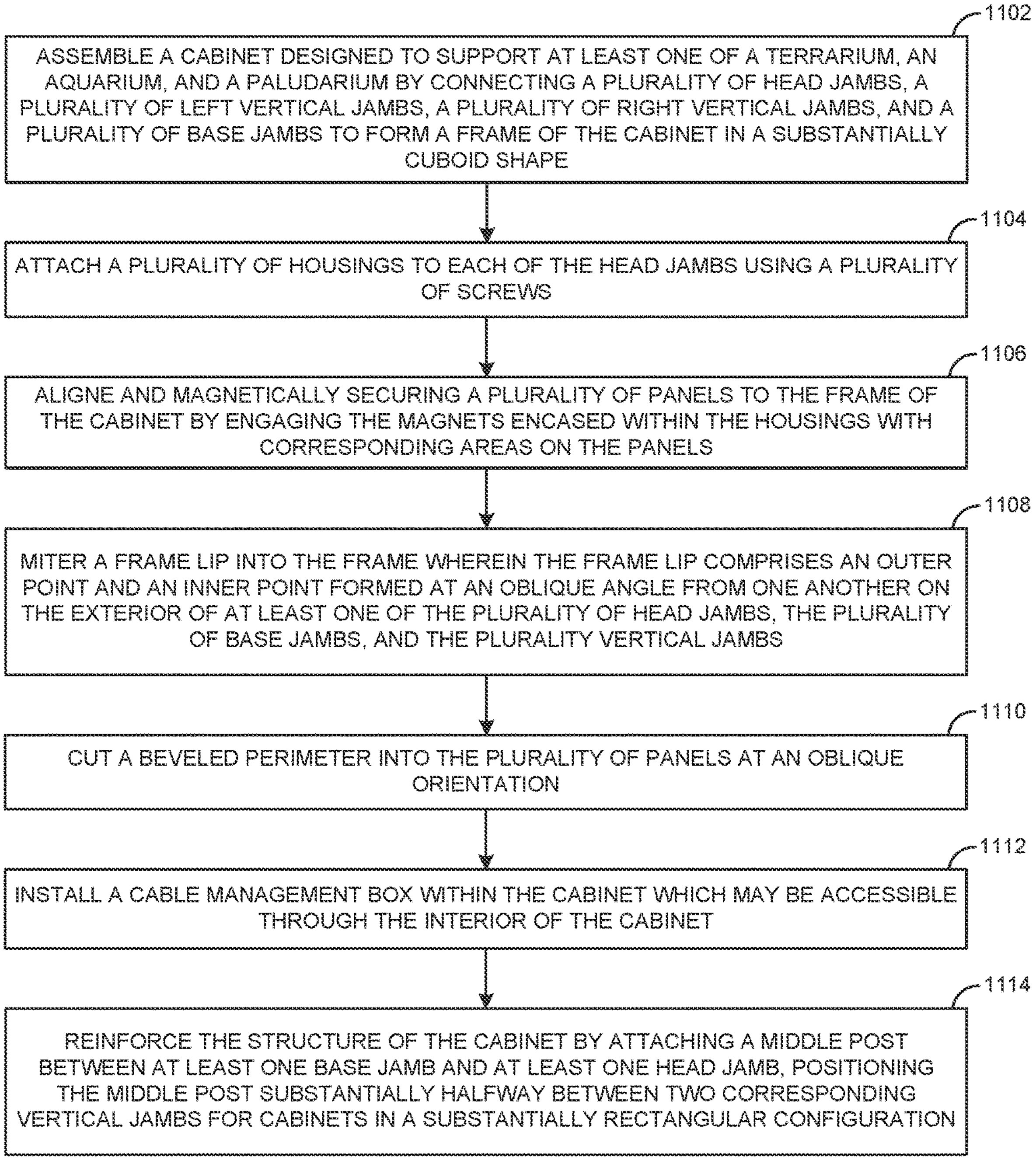
FIG. 11 is a process flow diagram showing the steps of forming the various cabinet embodiments of FIGS. 1-10, according to one embodiment.

FIG. 11 is a process flow diagram showing the steps of forming the various cabinet embodiments of FIGS. 1-10, according to one embodiment. In operation 1102, a cabinet may be assembled to support at least one of a terrarium, an aquarium, and a paludarium by connecting a plurality of head jambs, a plurality of left vertical jambs, a plurality of right vertical jambs, and a plurality of base jambs to form a frame of the cabinet in a substantially cuboid shape. In operation 1104, a plurality of housings may be attached to each of the head jambs using a plurality of screws. In operation 1106, a plurality of panels may be aligned and magnetically secured to the frame of the cabinet by engaging the magnets encased within the housings with corresponding areas on the panels. In operation 1108, a frame lip may be mitered into the frame wherein the frame lip comprises an outer point and an inner point formed at an oblique angle from one another on the exterior of at least one of the plurality of head jambs, the plurality of base jambs, and the plurality vertical jambs. In operation 1110, a beveled perimeter may be cutted into the plurality of panels at an oblique orientation. In operation 1112, a cable management box may be installed within the cabinet which may be accessible through the interior of the cabinet. In operation 1114, the structure of the cabinet may be reinforced by attaching a middle post between at least one base jamb and at least one head jamb, positioning the middle post substantially halfway between two corresponding vertical jambs for cabinets in a substantially rectangular configuration.

The embodiments of FIGS. 1-11 may remedy the problems associated with existing enclosures including but not limited plant growth apparatuses, aquariums, terrariums, and/or paludariums. The embodiments of FIGS. 1-11 may lessen the footprint of these enclosures by reducing the need for door space while enhancing the growing conditions for plants. The embodiments of FIGS. 1-11 may also increase user efficiency by allowing users the opportunity to work on components on the cabinet's interior from different sides and/or angles. The embodiments of FIGS. 1-11 may produce healthier and/or more robust plants while also lessening the need for cleaning within the apparatus. The embodiments of FIGS. 1-11 may decrease the need to replace enclosure base components because the embodiments of FIGS. 1-11 do not require components including but not limited to hinges, tracks, rollers, and/or wheels, all of which may at some point require replacement. Furthermore, the embodiments of FIGS. 1-11 may provide an easier means to grow plants for hobbyists and business owners alike.

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

The invention claimed is:

1. An apparatus comprising:

a cabinet for supporting an enclosure, wherein the cabinet comprises a frame to provide a primary structural support for the cabinet;

a head jamb of the frame located at a top-horizontal portion of the frame;

a vertical jamb of the frame of the cabinet that is attached to the head jamb to provide stability for the cabinet;

a base jamb of the frame of the cabinet that is attached to the vertical jamb to provide stability for the cabinet;

a housing that is attached to the head jamb;

a magnet at least partially encased in the housing;

a panel removably attached to the frame by magnetically connecting to the magnet encased within the housing, wherein when attached to the frame by magnet connection, the panel at least partially closes the cabinet;

a frame lip located on the exterior of at least one of the head jamb, the base jamb, and the vertical jamb, wherein the frame lip comprises an outer point and an inner point forming an oblique angle to each other, wherein the frame lip further comprises a lip exterior that is a most exterior portion of the frame lip; and a grab space formed at an area substantially between the outer point of the frame lip and a panel top, wherein the panel is shorter than a distance from a bottom of the cabinet and the outer point of the frame lip to form the grab space and allow for a user to grab the panel substantially near the panel top and pull the panel away from the magnet.

2. The apparatus of claim 1 further comprising:

a beveled perimeter of the panel formed at an oblique orientation relative to a panel interior and a panel exterior, wherein the beveled perimeter is substantially between the panel interior and the panel exterior, wherein the beveled perimeter and the frame lip form a ninety degree angle when the panel is attached to the cabinet by the magnet, wherein the lip exterior and the panel exterior are substantially planar when the panel is attached to the frame, and wherein the panel attaches to the magnet at an area below the beveled perimeter.

3. The apparatus of claim 1 further comprising:

a screw attaching the housing to the head jamb of the frame, wherein the screw is at least partially encased within the housing, and wherein the screw is made of at least one of stainless steel, brass, titanium, and aluminum.

4. The apparatus of claim 1 wherein the cabinet, the frame, the frame lip, and the panel are comprised of aluminum to provide resistance to rusting.

5. The apparatus of claim 1 further comprising:

a cable management box affixed within the cabinet that is accessible through the interior of the cabinet.

6. The apparatus of claim 1 wherein the housing is made from at least one of a polycarbonate, an acrylonitrile butadiene styrene, a polyethylene, a polypropylene, a polyvinyl chloride, a polyethylene terephthalate, a polyurethane, a silicone, a thermoplastic elastomers, and a thermoplastic polyurethane.

7. An apparatus comprising:

a cabinet for supporting at least one of a terrarium, an aquarium, and a paludarium, wherein the cabinet is a cuboid shape;

a frame of the cabinet comprising a plurality of head jambs, a plurality of left vertical jambs, a plurality of right vertical jambs, and a plurality of base jambs, wherein each of the head jambs is at a top-horizontal portion of the frame, wherein each left vertical jamb and each right vertical jamb connects to a corresponding head jamb, wherein each left vertical jamb and each right vertical jamb further attach to a corresponding base jamb, and wherein when connected, the plurality of head jambs, the plurality of left vertical jambs, the plurality of right vertical jambs, and the plurality of base jambs form the frame of the cabinet;

a plurality of housings attached to each of the head jambs, wherein at least two housings are attached to each of the head jambs;

a plurality of magnets encased in the plurality of housings, wherein each housing individually encases at least one magnet;

a plurality of screws attaching the plurality of housings to the plurality of head jambs of the frame, wherein at least one of the plurality of screws attaches at least one housing to at least one head jamb, and wherein the plurality of screws are at least partially encased within the housings;

a plurality of panels removably attached to the cabinet by magnetically connecting the panels to the magnets encased within the housings;

a frame lip on the exterior of each of the head jambs, each of the left vertical jambs, and each of the right vertical jambs, wherein the frame lip comprises an outer point and an inner point, wherein the outer point and the inner point of the frame lip are at a substantially oblique angle from each other; and a grab space formed at an area substantially between the outer point of the frame lip and a panel top, wherein the panels are shorter than the distance from a bottom of the cabinet and the outer point of the frame lip to form the grab space and allow for a user to grab at least one of the plurality of panels substantially near the panel top and pull the panel away from the magnets.

8. The apparatus of claim 7 further comprising:

a beveled perimeter of the plurality of panels that is formed at an oblique orientation, wherein the beveled perimeter is substantially between a panel interior and a panel exterior, wherein the beveled perimeter and the frame lip form a ninety degree angle when at least one panel is attached to the cabinet by the magnets, wherein a lip exterior and the panel exterior are substantially planar when at least one panel of the plurality of panels is attached to the frame, and wherein the panels attach to the magnets at an area below the beveled perimeter.

9. The apparatus of claim 7 wherein the frame, the frame lip, and the panels are comprised of at least one of aluminum, stainless steel, and galvanized steel to prevent rusting.

10. The apparatus of claim 7 further comprising:

a cable management box affixed within the cabinet that is accessible through the interior of the cabinet.

11. The apparatus of claim 7 further comprising:

a middle post of the frame to further reinforce the cabinet when the cabinet is in a substantially rectangular configuration, wherein the middle post is a vertically running support that is attached to at least one base jamb and at least one head jamb, and wherein the middle post is substantially halfway between one of the left vertical jambs and one of the right vertical jambs.

12. The apparatus of claim 11 further comprising:

a pair of planar front panels wherein both of the planar panels are adjacent to the middle post, making the cabinet comprising the plurality of panels two panels wide and one panel deep.

13. The apparatus of claim 7 wherein the plurality of housings are made from at least one of a polycarbonate, an acrylonitrile butadiene styrene, a polyethylene, a polypropylene, a polyvinyl chloride, a polyethylene terephthalate, a polyurethane, silicone, a thermoplastic elastomers, and a thermoplastic polyurethane.

14. The apparatus of claim 7 wherein the plurality of screws are made of at least one of a stainless steel, a brass, a titanium, and an aluminum.

* * * * *